(12) United States Patent
Okada et al.

(10) Patent No.: US 6,885,121 B2
(45) Date of Patent: Apr. 26, 2005

(54) CONTROLLED RADIAL MAGNETIC BEARING

(75) Inventors: Yohji Okada, Ibaraki (JP); Hideki Kanebako, Nagano (JP); Keisuke Abe, Chiba (JP)

(73) Assignee: Sankyo Seiki Mfg. Co. Ltd., Nagano (JP)

(*) Notice: Subject to any disclaimer, the term of this patent is extended or adjusted under 35 U.S.C. 154(b) by 0 days.

(21) Appl. No.: 10/474,012
(22) PCT Filed: Jul. 4, 2002
(86) PCT No.: PCT/JP02/06765
§ 371 (c)(1),
(2), (4) Date: Apr. 7, 2004
(87) PCT Pub. No.: WO03/004890
PCT Pub. Date: Jan. 16, 2003

(65) Prior Publication Data
US 2004/0150278 A1 Aug. 5, 2004

(30) Foreign Application Priority Data
Jul. 6, 2001 (JP) .......................................... 2001-206063

(51) Int. Cl.[7] ................................................ H02K 7/09
(52) U.S. Cl. .................................... 310/90.5; 310/181
(58) Field of Search ............................... 310/90.5, 193, 310/166, 168, 181

(56) References Cited

U.S. PATENT DOCUMENTS

| | | | | |
|---|---|---|---|---|
| 5,319,273 A | * | 6/1994 | Hockney et al. ............ | 310/90.5 |
| 5,585,680 A | * | 12/1996 | Tsoffka ...................... | 310/49 R |
| 5,705,871 A | * | 1/1998 | Suzuki et al. .......... | 310/156.44 |
| 5,847,483 A | * | 12/1998 | Suzuki et al. .......... | 310/156.45 |
| 5,962,940 A | * | 10/1999 | Imlach ....................... | 310/90.5 |

* cited by examiner

Primary Examiner—Dang Le
(74) Attorney, Agent, or Firm—Harness, Dickey & Pierce, PLC

(57) ABSTRACT

The flux densities formed by plural electromagnet poles M1 to M12 which are arranged at a predetermined interval in a circumferential direction of a rotary body 1 at the same position in an axial direction of the rotary body 1 are gradually changed in the circumferential direction of the rotary body. Even if there is a difference between the maximum value of the flux density and the minimum value, the change of the flux densities between the adjacent electromagnet poles is small and smooth. Accordingly satisfactory detective sensitivity and detection results can be obtained.

12 Claims, 15 Drawing Sheets

CONTROLLED RADIAL MAGNETIC BEARING

TECHNICAL FIELD TO WHICH THE INVENTION RELATES

This invention relates to a controlled type magnetic radial bearing which supports a rotary body used for an energy-storage flywheel, an ultra high-speed rotating body or the like in a non-contact manner in a radial direction.

BACKGROUND ART

Controlled type magnetic bearing devices, which magnetically levitate a rotary body for supporting in a non-contact state, have been widely used in various fields in recent years since the loss accompanied by rotation can be remarkably reduced.

Generally a controlled type magnetic bearing device is provided with a group of controlled type magnetic axial bearings which support a rotary body in a non-contact state in an axial direction and two groups of controlled type magnetic radial bearings which support the rotary body in a non-contact state in a radial direction. The magnetic radial bearing is equipped with plural electromagnets (usually four pieces) which are arranged at equal intervals in a circumferential direction of the rotary body. Each of the electromagnets is provided with a magnetic pole having a salient pole, which projects inside in a radial direction and opposes an outer periphery of the rotary body, and a coil for feeding an exciting electric current is wound around the magnetic pole. The exciting current is combined with a constant bias current and a control current controlled dependent on the displacement of the rotary body. A magnetic flux combined with a constant bias magnetic flux by the bias current and a control magnetic flux by the control current is formed in each of the magnetic poles.

In such a controlled type magnetic radial bearing, there is a problem caused by eddy current loss produced inside a rotary body at a high-speed rotation. An eddy current is generated when a flux density varies in a circumferential direction of the rotary body and the magnitude of the eddy current is proportional to the variation of flux density.

There are hetero-polar type and homo-polar type magnetic radial bearings according to the structure of an electromagnet. In the hetero-polar type magnetic radial bearing, each of the electromagnets has magnetic poles at two positions in a circumferential direction of the rotary body and the two magnetic poles are excited in opposite polarities by supplying an exciting current to coils. Since a plurality of such electromagnets are arranged in the circumferential direction of the rotary body, the magnetic poles with reversed polarities are arranged adjacently to each other in the circumferential direction of the rotary body. Therefore, the flux density around the rotary body is largely varied along the circumferential direction of the rotary body, a large eddy current flows inside the rotary body to generate an eddy current loss and increase the rotation loss.

On the other hand, in the homo-polar type magnetic radial bearing, each of the electromagnets has magnetic poles in two positions in the axial direction of a rotary body and two magnetic poles are excited with reversed polarities by supplying an exciting current to coils. By supplying the exciting currents so that the magnetic poles on the same side in the axial direction of the rotary body may become the same polarity, only the magnetic poles with the same polarity are arranged on the same side in the circumferential direction of the rotary body. Therefore, the change of the flux density becomes small along the circumferential direction of the rotary body. However, since there is still a difference of flux density between a portion with a magnetic pole and a portion with no magnetic pole, the change of flux density is generated between the magnetic poles arranged adjacently to each other in the circumferential direction of the rotary body. Therefore, approximately half the eddy current in the case of the hetero-polar type described above flows to generate approximately half the rotation loss of the hetero-polar type.

The eddy current described above can be decreased to a level having substantially no problem for an ordinary device by using laminated steel plates for the rotor part of a rotary body opposing the electromagnet. However, there have been increasing applications in recent years in which the loss of eddy current and the rotation loss due to the eddy current practically cause problems even though laminated steel plates are used for the rotor part of a rotary body in a device such as an energy-storage flywheel and an ultra high-speed rotary body.

Therefore, it is an object of the present invention to provide a controlled type magnetic radial bearing which is capable of suppressing generation of an eddy current to reduce the rotation loss in order to solve the above-mentioned problem.

DISCLOSURE OF THE INVENTION

According to the present invention, the above-mentioned object is achieved by a controlled type magnetic radial bearing provided with plural electromagnet poles which are arranged at a predetermined interval in a circumferential direction of a rotary body at the same position in an axial direction of the rotary body and all of the electromagnet poles are set to be the same polarity, characterized in that the flux densities formed by the electromagnet poles are gradually changed in the circumferential direction of the rotary body. The change of the flux densities in the circumferential direction of the rotary body becomes small and smooth. As a result, the eddy current generated in the rotary body during rotation is decreased, an eddy current loss and rotation loss are reduced and extremely satisfactory rotational characteristics can be obtained with a simple constitution at low cost.

Here, "the flux densities are gradually changed" means that even if there is a difference between the maximum value of the flux density and the minimum value, the change of the flux densities between the adjacent electromagnet poles is small and smooth.

Generally, plural electromagnet poles are arranged at equal intervals in the circumferential direction of the rotary body.

The present invention can be applied to any of conventional homo-polar type magnetic radial bearings in which an electromagnet forms a magnetic field only by a coil and conventional hybrid type magnetic radial bearings in which a permanent magnet forms a bias magnetic flux and an electromagnet forms a control magnetic flux by a coil. Moreover, the present invention can be applied to magnetic axial and radial bearings, which support both in the axial and radial directions in a non-contact state. In any case, the electromagnet is equipped with magnetic poles with a coil. The magnetic pole may have a salient pole or may be directly fitted with a coil on the inner peripheral face of a cylindrical stator without a salient pole. Moreover, the magnetic pole can be formed in a so-called closed slot type in which both of the tip end faces of adjacent salient poles are connected with each other by a thin protruded part.

The flux densities of the respective electromagnet poles become the maximum on the side where the rotary body is magnetically attracted and become the minimum on the opposite side. The change of the flux density is set to be, for example, in a shape of a cosine wave (or a shape of a sine wave) so as to change the flux density gradually between them.

In the case of hybrid type magnetic radial bearings in which an electromagnet has a permanent magnet, the polarity in the total magnetic flux combined with the bias magnetic flux by the permanent magnet and the control magnetic flux by a coil is set to be the same polarity with respect to all the electromagnets.

Therefore, according to the controlled type magnetic radial bearing of the present invention, since the flux density of the electromagnet poles changes continuously and gradually in a circumferential direction of the rotary body, the change of the flux density in a circumferential direction of the rotary body becomes small and smooth and the eddy current generated in the rotary body during rotation is reduced to make an eddy current loss and its rotation loss become small.

Also, in a controlled type magnetic radial bearing of the present invention, for example, at least three electromagnet poles are provided and the flux density by each of the electromagnet poles is varied gradually and continuously in the circumferential direction of the rotary body. The change of the flux density in the circumferential direction of the rotary body becomes small as a whole by means of that the flux densities of the respective electromagnet poles are gradually changed, and the eddy current is reduced to decrease the eddy current loss and rotation loss.

The change of the flux densities in the circumferential direction of the rotary body can be made smaller as the number of the electromagnet poles is increased and the number of the electromagnet poles is desirable to be the multiple of 4 or 3. In these cases, the control current can be controlled like the conventional controlled type magnetic radial bearings which have four electromagnet poles in the circumferential direction and the control current can be controlled easily. Therefore, the number of the electromagnet poles is preferably eight or more. In the case of the multiple of 3, it can be controlled by using a three-phase inverter widely used for driving a motor.

Furthermore, in the controlled type magnetic radial bearing according to the present invention, the flux densities by respective electromagnet poles can be gradually changed in the circumferential direction of the rotary body by, for example, adjusting the control current supplied to the coil of respective electromagnet poles. By adjusting the control current supplied to the coil of respective electromagnet poles, the change of the flux densities of respective electromagnet poles becomes small and the eddy current is reduced to decrease the eddy current loss and rotation loss.

At this time, the control current in respective electromagnet poles becomes, for example, the maximum value in the positive direction ("positive direction" is the direction of the control current which generates control magnetic flux as the same direction as the bias magnetic flux) on the side where the rotary body is attracted. The control current becomes the minimum value in the negative direction ("negative direction" is the direction of the control current which generates control magnetic flux as the opposite direction to the bias magnetic flux) on the opposite side. Further, the change of the control current between them is set so as to be in a cosine wave shape. As a result of that, the flux densities of respective electromagnet poles become the maximum on the side where the rotary body is attracted and become the minimum on the opposite side and, moreover, the change of the flux density between these maximum and minimum forms in a cosine wave shape.

For example, when the number of the electromagnet poles is a multiple of 4, two electromagnets are arranged in each of two control axes of the radial direction which are perpendicular to each other as a conventional controlled type magnetic radial bearing having four electromagnets. These four electromagnets are main electromagnets. In this case, the number of turns of the coil in each electromagnet pole is set to be a number of turns proportional to a sine wave or a cosine wave.

That is, when there are provided eight magnetic poles, the numbers of turns of the coils in the case of controlling in the up and down direction are set to be winding ratio of "1:0.707:0:−0.707:−1:−0.707:0:0.707" from the upper magnetic pole (negative means winding in the opposite direction) and the coils are connected in series. Here, 0.707= cos 45°. This value is the number of turns of the coil for making a magnetic field into a form similar to a cosine wave. In this example, displacement signals of the up and down directions are detected, and an operational signal for controlling at a regular position is generated and applied to the coil.

On the other hand, in the case of a hybrid type magnetic radial bearing, the coils of two electromagnet poles at a position opposing each other in the radial direction are connected in series and the same control current is fed in the two coils. Further, the winding directions of the two coils are set to be opposite in such a manner that, when the same control current is supplied to the coils of the two electromagnet poles opposing each other, the magnetic fluxes formed by the coils become opposite polarities to each other. That is, when the same control current is fed in the coils of the two electromagnet poles opposing each other, one is set in the positive direction and the other is set in the negative direction. Therefore, the number of amplifiers can be reduced to half the number of electromagnet poles.

Also in this case, by supplying the same reference control current to the coils of the magnetic poles of two main electromagnets with respect to each control axis, the reference control current in the positive direction is fed to the coil of the magnetic pole of one of the main electromagnets and the reference control current in the negative direction is fed to the coil of the magnetic pole of the other of the main electromagnets. Control currents, which are changed in a cosine wave shape when the reference control current in the positive direction is regarded as "1", are supplied to the sub-electromagnets. In this way, the control currents in each of the electromagnet poles become the maximum value in the positive direction on the side where the rotary body is attracted and the minimum value in the negative direction on the opposite side and, moreover, the control current is changed in a cosine wave shape along the whole circumferential direction of the rotary body. Consequently, the total flux density combined with the bias magnetic flux by the permanent magnet and the control magnetic flux by the control current becomes the maximum value on the side attracting the rotary body and the minimum value on the opposite side, and the change of the flux density along the whole circumferential direction of the rotary body becomes a cosine-shape.

In addition, in a controlled type magnetic radial bearing according to the present invention, for example, plural groups of coils to which the control current is individually supplied are provided, the coils of respective groups are wound around predetermined plural electromagnet poles in series and the number of turns of the coils in respective electromagnet poles of the same group are adjusted in such a manner that the flux densities of the respective electromagnet poles are gradually changed along the circumferential direction of the rotary body. Thus, since the flux densities of the respective electromagnet poles are gradually changed in the circumferential direction of the rotary body, the change of the flux densities in the circumferential direction of the rotary body becomes small as a whole, and an eddy current is reduced and eddy current loss and rotation loss become small.

In this case, since plural groups of coils are wound around plural electromagnet poles, some of the electromagnet poles are wound around with plural groups of the coils.

Moreover, the number of groups of the coils and the number of turns of the respective coils of each group in respective electromagnet poles are determined in such a manner that the total flux density of respective electromagnet poles becomes the maximum value on the side where the rotary body is attracted and the minimum value on the opposite side and the whole change of the flux density in the circumferential direction of the rotary body is, for example, in a cosine wave shape. For example, when the number of electromagnet poles is a multiple of 4, as described above, four electromagnets are used as the main electromagnet, the remaining electromagnets are used as a sub-electromagnet, and the control current is determined for the four main electromagnets as usual.

In the case of a homo-polar type magnetic radial bearing, one group of coils is provided for each main electromagnet, and an exciting current combined with a bias current and a control current is individually supplied to the coils of the respective groups. Therefore, four groups of coils are provided as a whole and four amplifiers are required. In this case, the coils of the respective groups are wound around the magnetic poles of the main electromagnet and the sub-electromagnets of the group that are on the same side in a direction of control axis of the main electromagnet with respect to the center of the rotary body. Also, the number of turns of the coil of respective electromagnet poles is determined so as to change in a cosine wave shape when the main electromagnet is regarded as "1". The control current determined as mentioned above is respectively supplied to the coils of each group. Therefore, the flux densities by the exciting currents in the coils of each group are changed in a cosine wave shape when the main electromagnet of the group is regarded as "1". As a whole, the flux densities of the respective electromagnet poles become the positive maximum value on the side where the rotary body is attracted and the negative minimum value on the opposite side and, moreover, the change of the flux densities in the circumferential direction of the rotary body becomes a cosine wave shape.

In the case of a hybrid type magnetic radial bearing, one group of coils is provided for each control axis and a control current is individually supplied to the coil of each group. Therefore, two groups of coils are provided on the whole and two amplifiers are required. In this case, the coils of each group are wound around the two main electromagnets and all the sub-electromagnets of the group in the control axis, and the number of turns of the coil of each electromagnet pole is determined so as to change in a cosine wave shape when the main electromagnet is regarded as "1". Moreover, the winding directions of the coils are set to be reverse in such a manner that, when the control current is fed in the coils of each group, the control magnetic fluxes formed by the coils become opposite polarities to each other at the both ends in the direction of the control axis with respect to the center of the rotary body. Therefore, when the same control current is fed in the coils of each group, the current on one side in the direction of the control axis becomes a positive direction and the current on the opposite side becomes a negative direction. And the control current determined as mentioned above is supplied to the coils of each group. Accordingly, the control flux densities by the control current in the coils of each group are changed in a cosine wave shape when the main electromagnet of the group is regarded as "1". The total flux density combined with the bias magnetic flux and control magnetic flux becomes the maximum value on the side where the rotary body is attracted and the minimum value on the opposite side and the change of the flux density along the whole circumferential direction of the rotary body becomes a cosine wave shape.

When the number of magnetic poles is a multiple of 3, a three-phase amplifier which is generally used as a drive amplifier for a motor can be used for control. For example, in the case of six salient poles, the present invention can be realized at low cost by supplying a positive or negative current to the opposing magnetic poles with a three-phase inverter. A constitutional example of a magnetic radial bearing in this case is shown in FIG. 15. In FIG. 15, the direction x and the direction y of a shaft A are detected by an X-sensor Sx and a Y-sensor Sy. When the shaft A is not in the center, the sensor signals are inputted into a controller Cont to generate an operational signal for returning the shaft to the center. The operational signals of two phases in the x and y directions are converted into three-phase operational signals of U, V, and W by a 2-phase/3-phase conversion CV and are amplified by a three-phase drive amplifier AP. The control currents of the six salient poles are controlled by the current.

A controlled type magnetic radial bearing according to the present invention is provided with, for example, at least three electromagnet poles. Each of the electromagnet poles includes a salient pole projected inside in a radial direction. At both ends of the opposing portion of respective salient poles to the rotary body in the whole circumferential direction, protruded parts protruding in the circumferential direction are formed so as to be close to each other.

In this case, the number of turns of the coils of each of the electromagnet poles is set to be the same and the control of control current in each electromagnet pole can be performed as usual. Further, the flux density is gradually changed in the circumferential direction of the rotary body by forming the protruded parts in a salient pole. The difference of the flux densities between a portion having a salient pole and a portion having no salient pole becomes small because the protruded parts are formed in a close relation together. Therefore, since the change between the salient poles is reduced, eddy current decreases and an eddy current loss and rotation loss become small.

In addition, as an electromagnet pole according to the present invention, so-called closed slot type magnetic poles in which the tip ends of each salient pole are connected with adjacent salient poles to each other by a narrow protruded part can be also adopted. When such closed slot type magnetic poles are used, the flux density is continuously and smoothly changed in the circumferential direction of the rotary body in the salient poles. Therefore, the difference of the flux densities between a salient pole portion and a no salient pole portion becomes very small because the adjacent salient poles are connected with each other. Since the change between the salient poles is in an extremely smooth state and an eddy current loss and rotation loss are extremely lowered.

BEST MODE FOR CARRYING OUT THE INVENTION

Hereafter, embodiments of the present invention will be described below with reference to the drawings.

Figure 1:
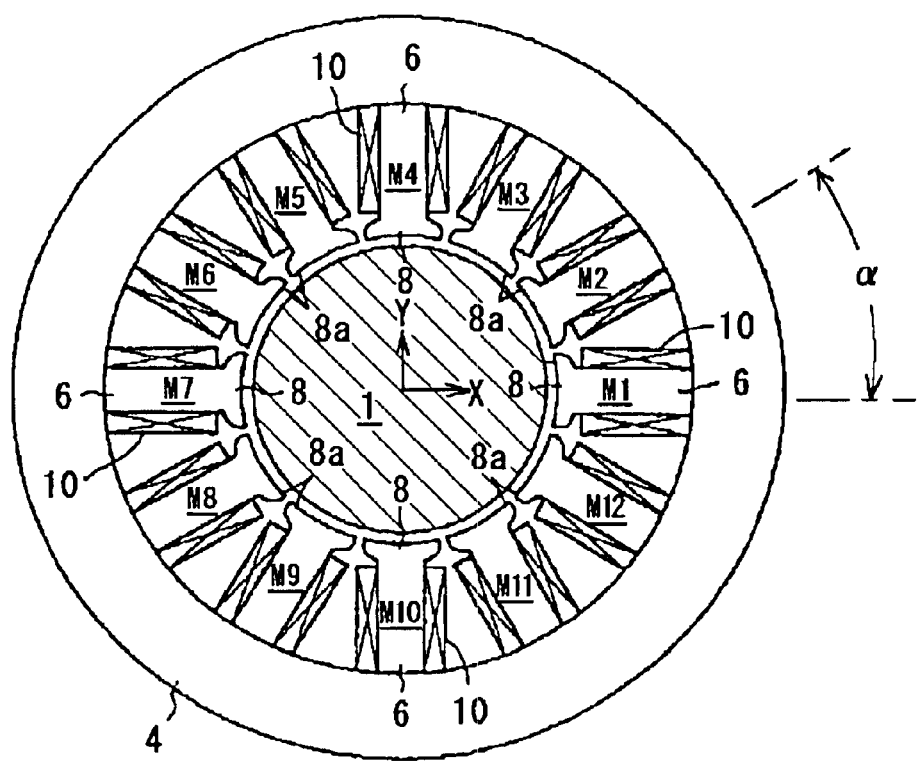
FIG. 1 is a cross-sectional view of a controlled type magnetic radial bearing which shows a first embodiment of the present invention.
Figure 2:
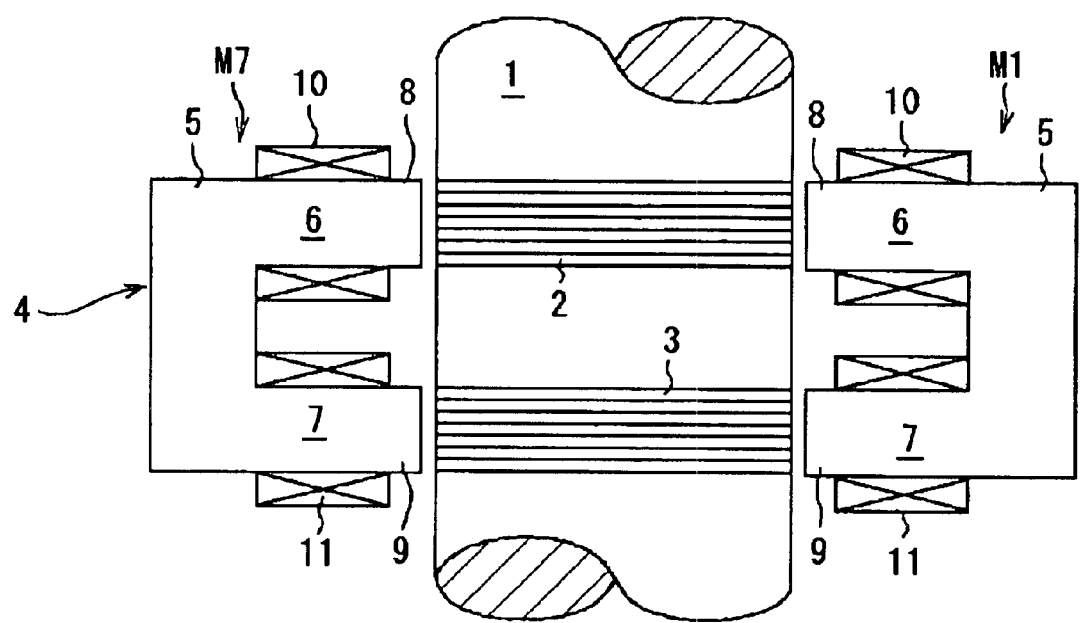
FIG. 2 is a longitudinal-sectional view of the first embodiment.
Figure 3:
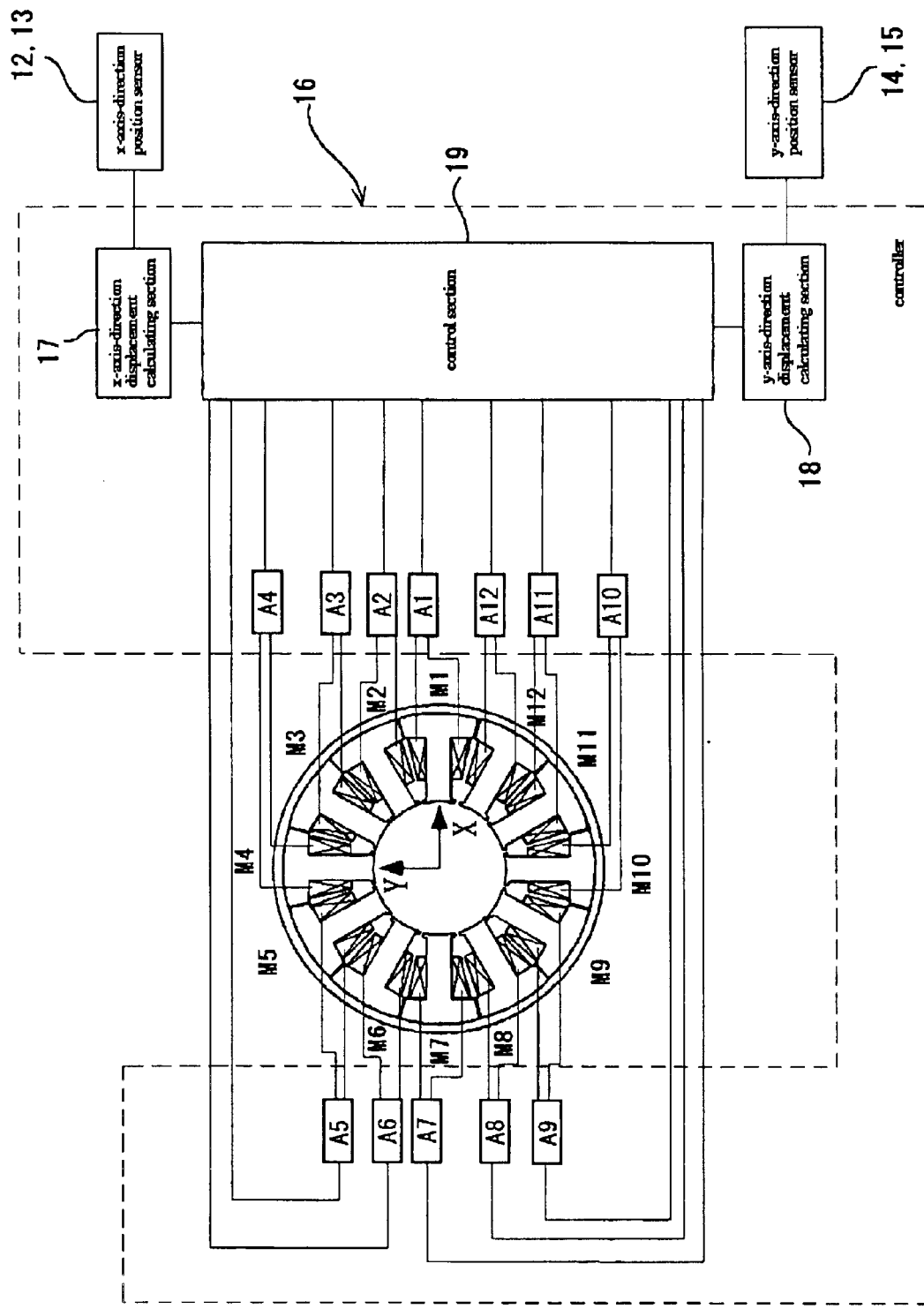
FIG. 3 is a block diagram showing a constitution of a control system of the first embodiment.

FIGS. 1 to 3 show a first embodiment. A controlled type magnetic radial bearing of the first embodiment is a homopolar type, and FIG. 1 is a cross-sectional view, FIG. 2 is a longitudinal-sectional view and FIG. 3 shows a constitution of a control system. In the following description, one of two radial control axes which are perpendicular to each other is set to be an x-axis and the other is set to be a y-axis.

As shown in FIG. 1, a magnetic radial bearing is provided with twelve homo-polar type electromagnets M1, M2, M3, M4, M5, M6, M7, M8, M9, M10, M11 and M12. Hereafter, these electromagnets are generically shown with a notational symbol "M." The twelve electromagnets M are arranged with equal intervals in a circumferential direction (called "circumferential direction" hereafter) around a rotary body 1, which is disposed, for example, in a vertical direction. The arranging interval (angle) between the respective electromagnets M is $\pi/6$ (=30°), and this is shown as $\alpha$. A first electromagnet M1 is arranged on the positive side of an x-axis (right side in FIG. 1), a seventh electromagnet M7 is arranged on the negative side of the x-axis (left side in FIG. 1), a fourth electromagnet M4 is arranged on the positive side of a y-axis (up side in FIG. 1) and a tenth electromagnet M10 is arranged on the negative side of the y-axis (under side in FIG. 1) respectively. They are called main electromagnets. The remaining electromagnets M2, M3, M5, M6, M8, M9, M11 and M12 are arranged between the main electromagnets M1, M4, M7 and M10 at equal intervals. These are called sub-electromagnets.

Rotor parts 2 and 3 using laminated steel plates are respectively formed on an outer peripheral part of the rotary body 1 at two places which are set to have a predetermined interval in an axial direction of the rotary body 1 (called "axial direction" hereafter), i.e., a vertical direction in FIG. 2. A stator 4 in a circular shape is arranged around the rotor parts 2 and 3 so as to be concentric with the rotary body 1 and the electromagnets M are provided in the portion of the stator 4.

Especially as shown in FIG. 2, respective electromagnets M are equipped with a core 5 composed of laminated steel plates whose longitudinal section is shown in an approximately U-shape and have salient poles 8 and 9 composing magnetic poles 6 and 7 which project inside in the radial direction at vertical ends in the axial direction. The upper salient pole 8 in FIG. 2 is opposed to the upper rotor part 2 in FIG. 2 and the lower salient pole 9 is opposed to the lower rotor part 3. The inner faces (tip end face) of the respective salient poles 8 and 9 in the radial direction, which are opposed to the outer peripheral faces of the rotor parts 2 and 3, are formed in a concave cylindrical face along the outer peripheral faces of the rotor parts 2 and 3. Protruded parts 8a and 8a protruded in the circumferential direction are integrally formed at both circumferential ends of the tip end face and the tip end parts of the adjacent protruded parts 8a are arranged so as to be close to each other in the circumferential direction.

Coils 10 and 11 for feeding an exciting current are respectively wound around the upper and lower salient poles 8 and 9 of the respective electromagnets M to form magnetic poles 6 and 7. The numbers of turns of the coils 10 and 11 of the respective electromagnets M are set to be equal to each other, and the coils 10 and 11 of the upper and lower magnetic poles 6 and 7 in respective electromagnets M are connected in series with each other.

Next, with reference to FIG. 3, a control system for the magnetic radial bearing according to the first embodiment will be described. In FIG. 3, only the portions of the rotary body 1 and the magnetic pole 6 of the respective electromagnets M are shown.

Although detailed illustration is omitted, two x-axis-direction position sensors 12 and 13 for detecting displacement of the rotary body 1 in the x-axis direction and two y-axis-direction position sensors 14 and 15 for detecting displacement of the rotary body 1 in the y-axis direction are provided near the electromagnets M.

A controller (control means) 16 for radial direction control which controls the exciting current supplied to the coils 10 and 11 of the respective electromagnets M based on the output signal from the position sensors 12 to 15 is provided in the magnetic radial bearing. The controller 16 is provided with an x-axis-direction displacement calculating section 17 for determining a displacement of the rotary body 1 in the x-axis direction by calculating the difference between the output signals of the two x-axis-direction position sensors 12 and 13, and a y-axis-direction displacement calculating section 18 for determining a displacement of the rotary body 1 in the y-axis direction by calculating the difference between the output signals of the two y-axis-direction position sensors 14 and 15. A PID control section 19 is also provided for outputting exciting-current signals to the respective electromagnets M based on the displacements of the x-axis direction and the y-axis direction of the rotary body 1. The exciting-current signals outputted to the respective electromagnets M from the PID control section 19 are respectively amplified by twelve amplifiers (current amplifier) A1, A2, A3, A4, A5, A6, A7, A8, A9, A10, A11 and A12, which are provided corresponding to the coils 10 of the respective electromagnets M and then supplied. These amplifiers are named generically as a notational symbol A.

As similar to the case of a conventional controlled type magnetic radial bearing having four electromagnets, the PID control section 19 of the controller 16 has a function for calculating a control current value Ixc in the x-axis direction with respect to the two main electromagnets M1 and M7 in the x-axis direction based on the displacement in the x-axis direction of the rotary body 1. The PID control section 19 also has a function for calculating a control current value Iyc in the y-axis direction with respect to the two main electromagnets M4 and M10 in the y-axis direction based on the displacement in the y-axis direction of the rotary body 1. These control current values Ixc and Iyc are regarded as a reference control current value.

Next, the PID control section 19 is constituted so as to determine the control current values supplied to the coils 10 of the respective electromagnets M based on the reference control current values Ixc and Iyc in such a manner that the control currents in the respective electromagnets M become the maximum value in the positive direction on the side where the rotary body 1 is magnetically attracted and become the minimum value in the negative direction on the opposite side, and are gradually changed in the circumferential direction. These control current values supplied to the coils 10 of the respective electromagnets M are generically named as Ic. The PID control section 19 amplifies an exciting-current value signal, which is the sum of a bias-current value signal proportional to a constant bias-current value Ic and a control current value signal proportional to the control current value Ic calculated as described above, and outputs it to the amplifier A. Twelve amplifiers A amplify twelve exciting-current value signals and supply the excitation signals to the coils 10 of the corresponding twelve electromagnets M.

The PID control section 19 in this example determines the control current value Ic supplied to the coil 10 of the respective electromagnets M so that the control current in the respective electromagnets M may be changed in a cosine wave shape. In this case, a control current value Ic supplied to an electromagnet M in an arbitrary position is generally expressed by the following expression. In the following expression, θ is an angle expressing the position of the electromagnet M, that is, the angle is expressed in the counterclockwise direction when the position of the first electromagnet M1 (position in the positive direction of the x-axis) is set to be "0".

$$Ic = Ixc \cdot |\cos \theta| + Iyc \cdot |\sin \theta| \, (0 \leq \theta \leq \pi/4) \quad (1)$$

$$Ic = -Ixc \cdot |\cos \theta| + Iyc \cdot |\sin \theta| \, (\pi/4 \leq \theta \leq \pi/2) \quad (2)$$

$$Ic = -Ixc \cdot |\cos \theta| - Iyc \cdot |\sin \theta| \, (\pi/2 \leq \theta \leq 3\pi/4) \quad (3)$$

$$Ic = Ixc \cdot |\cos \theta| - Iyc \cdot |\sin \theta| \, (3\pi/4 \leq \theta \leq \pi) \quad (4)$$

Therefore, when the control current values Ic of the exciting currents (=Io+Ic) supplied to the coils 10 of respective electromagnets M from the twelve amplifiers A are respectively Ic1, Ic2, Ic3, Ic4, Ic5, Ic6, Ic7, Ic8, Ic9, Ic10, Ic11 and Ic12, these are expressed as follows:

$$Ic1 = Ixc \cdot \cos 0 + Iyc \cdot \sin 0 = Ixc \quad (5)$$

$$Ic2 = Ixc \cdot \cos \alpha + Iyc \cdot \sin \alpha = 0.866 \cdot Ixc + 0.5 \cdot Iyc \quad (6)$$

$$Ic3 = Ixc \cdot \cos 2\alpha + Iyc \cdot \sin 2\alpha = 0.5 \cdot Ixc + 0.866 \cdot Iyc \quad (7)$$

$$Ic4 = Ixc \cdot \cos 3\alpha + Iyc \cdot \sin 3\alpha = Iyc \quad (8)$$

$$Ic5 = -Isc \cdot \cos 2\alpha + Iyc \cdot \sin 2\alpha = -0.5 \cdot Ixc + 0.866 \cdot Iyc \quad (9)$$

$$Ic6 = -Ixc \cdot \cos \alpha + Iyc \cdot \sin \alpha = -0.866 \cdot Ixc + 0.5 \cdot Iyc \quad (10)$$

$$Ic7 = -Ixc \cdot \cos 0 + Iyc \cdot \sin 0 = -Ixc \quad (11)$$

$$Ic8 = -Ixc \cdot \cos \alpha - Iyc \cdot \sin \alpha = -0.866 \cdot Ixc - 0.5 \cdot Iyc \quad (12)$$

$$Ic9 = -Ixc \cdot \cos 2\alpha - Iyc \cdot \sin 2\alpha = -0.5 \cdot Ixc - 0.866 \cdot Iyc \quad (13)$$

$$Ic10 = Ixc \cdot \cos 3\alpha - Iyc \cdot \sin 3\alpha = -Iyc \quad (14)$$

$$Ic11 = Ixc \cdot \cos 2\alpha - Iyc \cdot \sin 2\alpha = 0.5 \cdot Ixc - 0.866 \cdot Iyc \quad (15)$$

$$Ic12 = Ixc \cdot \cos \alpha + Iyc \cdot \sin \alpha = 0.866 \cdot Ixc - 0.5 \cdot Iyc \quad (16)$$

Accordingly, the control currents in the respective electromagnets M become the maximum value in the positive direction on the side where the rotary body 1 is attracted and become the minimum value in the negative direction on the opposite side, and moreover, the change of the control currents becomes a cosine wave shape along the circumferential direction as a whole. Consequently, the exciting current becomes the maximum value on the side where the rotary body 1 is attracted and becomes the minimum value on the opposite side. The exciting currents change in a cosine wave shape between the maximum value and the minimum value, and the change of the flux density along the whole circumferential direction becomes a cosine wave shape.

Figure 4:
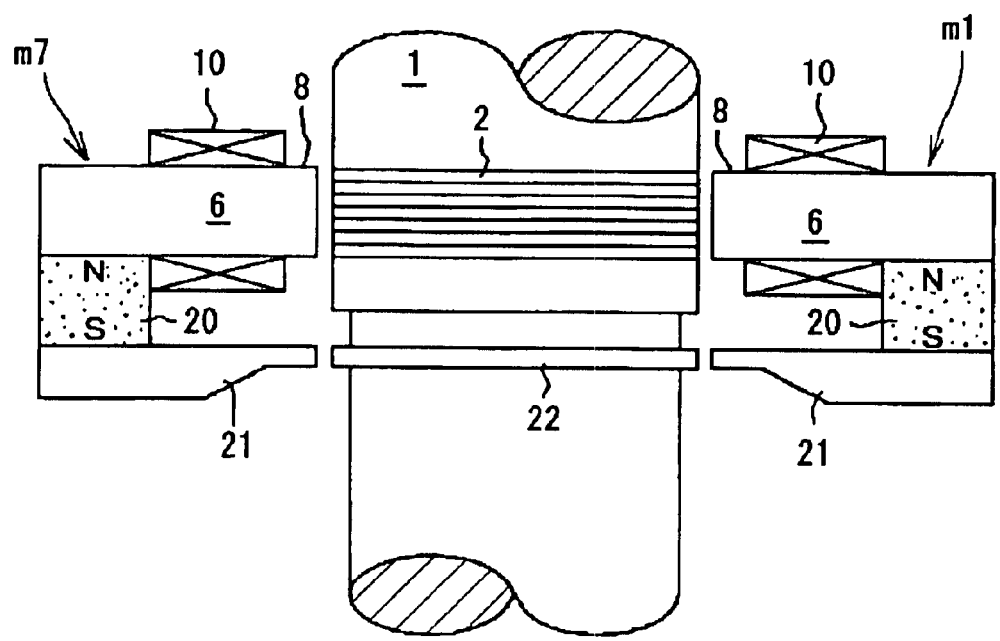
FIG. 4 is a longitudinal-sectional view of a controlled type magnetic radial bearing which shows a second embodiment of the present invention.
Figure 5:
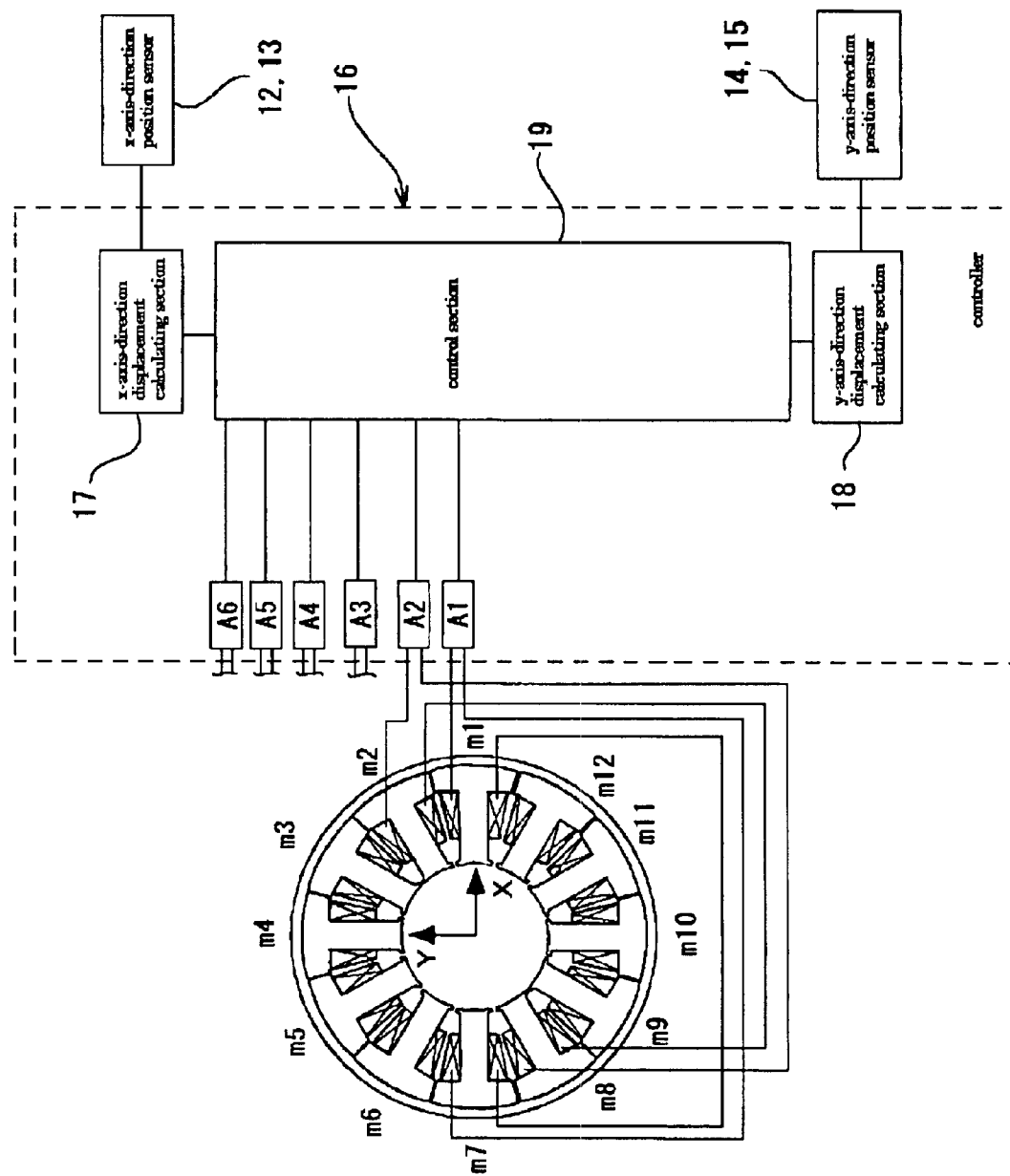
FIG. 5 is a block diagram showing a constitution of a control system of the second embodiment.

FIGS. 4 and 5 show a second embodiment. A magnetic radial bearing according to the second embodiment is of a hybrid type. FIG. 4 shows a longitudinal sectional view and FIG. 5 shows a constitution of a control system. In FIGS. 4 and 5 according to the second embodiment, the same notational symbol is given to the portion corresponding to the first embodiment mentioned above in FIGS. 2 and 3.

The magnetic radial bearing is equipped with twelve hybrid-type electromagnets m1 to m12 arranged similar to the case of the first embodiment. As shown in FIG. 4, each of the electromagnets "m" is provided with a permanent magnet 20 which has magnetic poles at both vertical ends. A salient pole 8 around which a coil 10 is wound and constitutes a magnetic pole 6 is arranged at an upper end of the permanent magnet 20. In addition, a yoke 21 for bias is provided under the lower end of the permanent magnet 20 in the drawing and the whole electromagnet "m" is formed in an approximately U-shape.

The salient pole 8 is constituted of the laminated steel plates and arranged so as to oppose the outer peripheral face of the rotor part 2 of the rotary body 1. The yoke 21 is opposed to the outer peripheral face of a flange 22 formed at the lower part of the rotor part 2 of the rotary body 1. The permanent magnet 20 is arranged so that all the polarities on the same upper or lower side in the drawing may become the same. In this example, the permanent magnet 20 is arranged so that its upper side is the N pole and the lower side is the S pole. Accordingly, a closed magnetic path is formed by the permanent magnet 20 so as to be formed from the upper end of the permanent magnet 20 to the lower end of the permanent magnet 20 through the salient pole 8, the rotary body 1 and the yoke 21. An N-pole bias magnetic pole is formed at the end of the salient pole 8 and an S-pole bias magnetic pole is formed at the end of the yoke 21. The numbers of turns of the coils 10 of the respective electromagnets "m" are respectively set to be equal.

As shown in FIG. 5, the coils 10 of two electromagnets "m" at the opposing positions in the radial direction are connected in series. Namely, the coils 10 of the first electromagnet m1 and the seventh electromagnet m7, the coils 10 of the second electromagnet m2 and the eighth electromagnet m8, the coils 10 of the third electromagnet m3 and the ninth electromagnet m9 (not shown), the coils 10 of the fourth electromagnet m4 and the tenth electromagnet m10 (not shown), the coils 10 of the fifth electromagnet m5 and the eleventh electromagnet m11 (not shown) and the coils 10 of the sixth electromagnet m6 and the twelfth electromagnet m12 (not shown) are respectively connected in series. The same control current is respectively supplied to the coils 10 of the two opposing electromagnets "m", which are connected in series. In addition, the winding directions of the coils 10 of the two electromagnets "m" are reversed in respect to each other in such a manner that, when the same control current is passed in the coils 10 of the two opposing electromagnets "m", the polarities of the magnetic fluxes formed by the control current become opposite at the two electromagnets "m". That is, when the same control current is supplied to the coils 10 of the two opposing electromagnets "m", one is made in the positive direction and the other is made in the negative direction.

The constitution of the controller 16 is similar to the first embodiment except for the number of amplifiers A and a part of processing in the control section 19. That is, the controller 16 is provided with six amplifiers A1 to A6, which respectively correspond to the group of the first electromagnet m1 and the seventh electromagnet m7, the group of the second electromagnet m2 and the eighth electromagnet m8, the group of the third electromagnet m3 and the ninth electromagnet m9, the group of the fourth electromagnet m4 and the tenth electromagnet m10 and the group of the fifth electromagnet m5 and the eleventh electromagnet m11 and the group of the sixth electromagnet m6 and the twelfth electromagnet m12. In FIG. 5, the connecting relationship about the amplifiers A3 to A6 is omitted, but they are connected in the same manner as the amplifiers A1 and A2 as described above.

In the controller 16, as in the case of the first embodiment, the control section 19 calculates the reference control current value Ixc in the X-axis direction and the reference control current value Iyc in the Y-axis direction and determines the control current values Ic supplied to the coils 10 of the respective electromagnets M based on these reference control current values Ixc and Iye. The control current value signals proportional to the control current values Ic are outputted to the amplifier A. Six amplifiers A amplify the six control current value signals and supply the control currents Ic to the coils 10 of the six corresponding groups of the electromagnets M.

Also in this example, the control section 19 determines the control current values Ic supplied to the coils 10 of the six groups of every two electromagnets "m" so that the control currents of the respective electromagnets "m" may be changed in a cosine wave shape. In this case, the control current values Ic supplied to an electromagnet which is at an arbitrary position θ are generally expressed as the above-mentioned expressions (1)~(4) in the first embodiment. Therefore, when the control current values Ic supplied to the coils 10 of the six sets of every two electromagnets "m" from the six amplifiers A is respectively set to be Ic1, Ic2, Ic3, Ic4, Ic5 and Ic6, these will be expressed as the above-mentioned expressions (5)~(10) in the first embodiment. Accordingly, the control currents of the expressions (5)~(10) are supplied to the coils 10 of the first electromagnet m1 to the sixth electromagnet m6. In addition, since the winding direction of the coils 10 of the seventh electromagnet m7 to the twelfth electromagnet m12 is set to be reversed to that of the coils 10 of the first electromagnet m1 to the sixth electromagnet m6, the control currents of the above-mentioned expressions (11)~(16) are supplied to the coils 10 of the seventh electromagnet m7 to the twelfth electromagnet m12.

By supplying the control currents to the coils 10 of the respective electromagnets "m" as described above, the total magnetic fluxes combined with the bias magnetic flux by the permanent magnet 20 and the control magnetic flux by the control current are formed in the magnetic poles 6 of the respective electromagnets "m". At this time, the same control current is supplied to the coils 10 of the two electromagnets "m" of each group. However, since one is in the positive direction and the other is in the negative direction, the polarities of the control magnetic fluxes generated on the respective groups of the two electromagnets "m" are opposite and the absolute values of the control flux densities are equal to each other. Also, the polarity of the control magnetic flux is the same as that of the bias magnetic flux, i.e., the N pole, on the side where the rotary body 1 is attracted, and the polarity of the control magnetic flux is opposite to that of the bias magnetic flux on the opposite side. Therefore, the total flux density becomes larger than the bias flux density on the side where the rotary body 1 is attracted and the total flux density becomes smaller than the bias flux density on the opposite side. The maximum value of the control current Ic is set in such a manner that the absolute value of the control flux density becomes smaller than that of the bias flux density. Therefore, the total magnetic flux combined with the bias magnetic flux and the control magnetic flux will be the same polarity (N pole) with respect to all the electromagnets M.

Other constitutions and operations are the same as those of the first embodiment. In the case of the second embodiment, the number of the required amplifiers A is half the number of the electromagnets "m".

Figure 6:
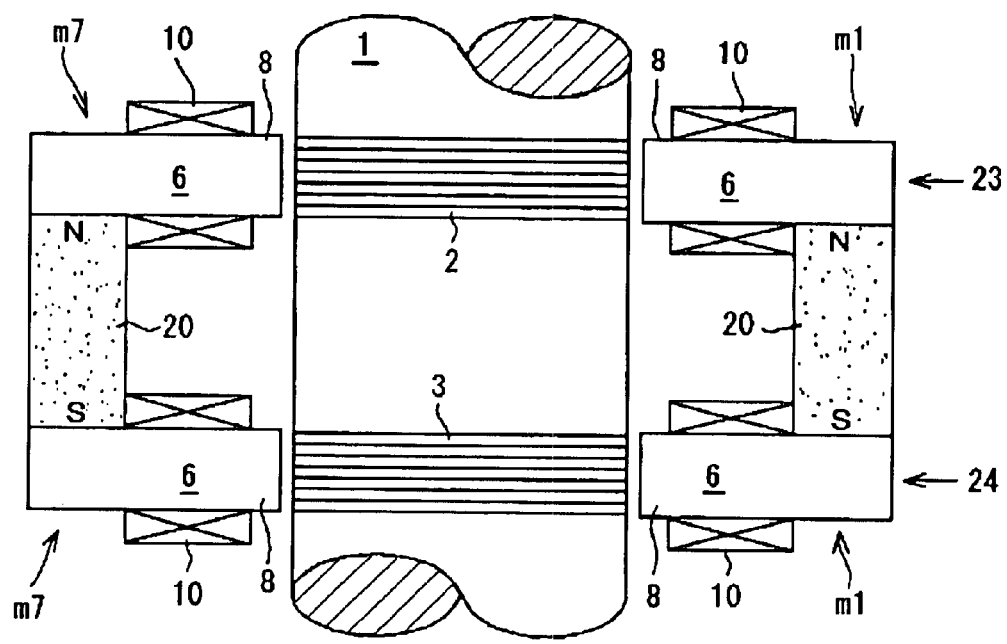
FIG. 6 is a longitudinal-sectional view of a controlled type magnetic radial bearing which shows a third embodiment of the present invention.

FIG. 6 shows a third embodiment according to the present invention. The third embodiment shows a magnetic radial bearing device in which two sets of upper and lower controlled type magnetic radial bearings 23 and 24 are integrally constituted. FIG. 6 shows its longitudinal sectional view. In FIG. 6 of the third embodiment, the same notational symbols are given to the portions corresponding to those of the first embodiment in FIG. 2 and those of the second embodiment in FIG. 4.

The upper magnetic radial bearing 23 is provided with twelve electromagnets (upper electromagnets) m1 to m12 arranged in a similar manner as the second embodiment described above. Each of the electromagnets "m" is equipped with a salient pole 8, around which a coil 10 is wound so as to constitute a magnetic pole 6. Each of the salient poles 8 is opposed to the outer peripheral face of an upper rotor part 2 of the rotary body 1. The lower magnetic radial bearing 24 is equipped with twelve electromagnets (lower electromagnets) m1 to m12 arranged in the similar manner as the upper electromagnets "m". In FIG. 6, only two lower electromagnets m1 and m7 are shown. The lower electromagnets are shown generically with a notational symbol "m". The constitution of the lower electromagnets "m" is the same as the upper electromagnets "m" and the same notational symbol is given to the same portion.

The salient pole 8 of the lower electromagnet "m" is opposed to the outer peripheral face of the lower rotor part 3 of the rotary body 1. Both the outside ends in the radial direction of the salient pole 8 of the upper electromagnet "m" and the salient pole 8 of the lower electromagnet "m" which are corresponding to each other are connected with a permanent magnet 20 in a cylindrical shape. The upper end of the permanent magnet 20 is formed as an N pole and the lower end is as an S pole as in the case of the second embodiment. Therefore, a closed magnetic path is formed by the permanent magnet 20, which is from the upper end of the permanent magnet 20 to the lower end of the permanent magnet 20 via the salient pole 8 of the upper electromagnet "m", the rotary body 1 and then the salient pole 8 of the lower electromagnet "m". The bias magnetic pole of the N pole is formed in the magnetic pole 6 of the upper electromagnet "m" and the bias magnetic pole of the S pole is formed in the magnetic pole 6 of the lower electromagnet "m".

The constitution of the upper magnetic radial bearing 23 and the lower magnetic radial bearing 24 is similar to that in the second embodiment.

Figure 7:
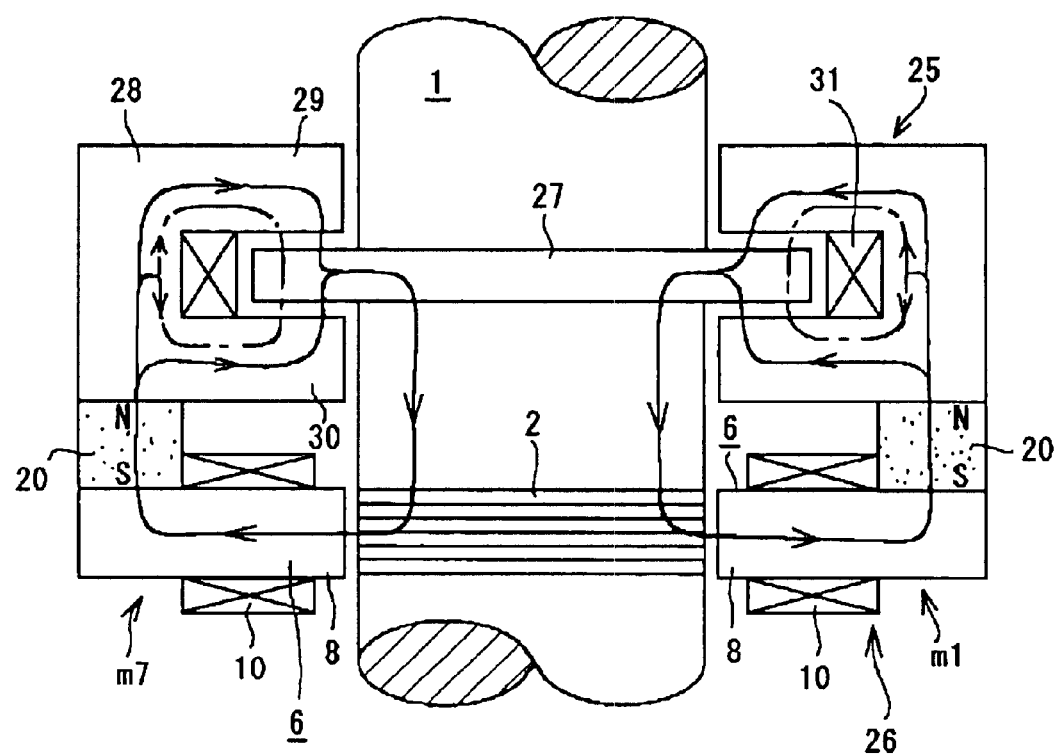
FIG. 7 is a longitudinal-sectional view of a controlled type magnetic radial bearing which shows a fourth embodiment of the present invention.

FIG. 7 shows a fourth embodiment. The fourth embodiment shows a magnetic axial and radial bearing device which is integrally constituted of a controlled type magnetic axial bearing 25 on an upper side in the drawing and a controlled type magnetic radial bearing 26 on a lower side in the drawing. FIG. 7 shows a longitudinal sectional view. In FIG. 7 according to the fourth embodiment, the same notational symbol is given to the portion corresponding to that of the second embodiment in FIG. 4 described above.

The magnetic axial bearing 25 is equipped with a circular core 28 arranged around a flange 27 formed in the rotary body 1. The longitudinal-sectional configuration of the core 28 is formed in a U-shape. Ring-shaped magnetic poles 29 and 30 are formed so as to interpose the flange 27 between both ends of the poles 29 and 30 on the upper and lower sides in the vertical direction. A circular shaped coil 31 for feeding a control current for the axial direction is provided on the outer portion in the radial direction on the inner side of the core 28.

The magnetic radial bearing 26 is equipped with twelve electromagnets m1 to m12, which are similar to the second embodiment. The outside end in the radial direction of the salient pole 8 of the respective electromagnets "m" and the outside end in the radial direction of the core 28 of the axial magnetic bearing 25 are connected with a similar permanent magnet 20 as that of the second embodiment. A closed magnetic path is formed by the permanent magnet 20, which is from the upper end of the permanent magnet 20 to the lower end of the permanent magnet 20 via the upper or lower magnetic pole 29 or 30 of the core 28 of the axial magnetic bearing 25, the flange 27 of the rotary body 1, the rotary body 1, and then the salient pole 8 of the magnetic radial bearing 26 as shown in a solid line in FIG. 7. Accordingly, a bias magnetic flux is formed between the upper or lower magnetic poles 29 or 30 of the axial magnetic bearing 25 and the flange 27, and the magnetic flux of an S pole is formed in the salient pole 8 of the magnetic radial bearing 26.

In the axial magnetic bearing 25, a control current is supplied to the coil 31 from a controller for axial direction control not illustrated. Thereby, as shown in a chain line in FIG. 7, an annular control magnetic flux passing through the upper and lower magnetic poles 29 and 30 and the flange 27 of the rotary body 1 is formed. When the direction of the control current is changed, the direction of the control magnetic flux also is changed. The bias magnetic flux is strengthened by the control magnetic flux between the flange 27 and one of the magnetic poles 29 and 30 and the bias magnetic flux is weakened by the control magnetic flux between the flange 27 and the other of the magnetic poles 29 and 30. The direction and magnitude of the control current which are supplied to the coil 31 are controlled based on a displacement in the axial direction of the rotary body 1 that is detected by an axial position sensor not illustrated. Therefore, the rotary body 1 is held at a neutral position in the axial direction. The constitution of the magnetic radial bearing 26 is similar to that of the second embodiment.

Figure 8:
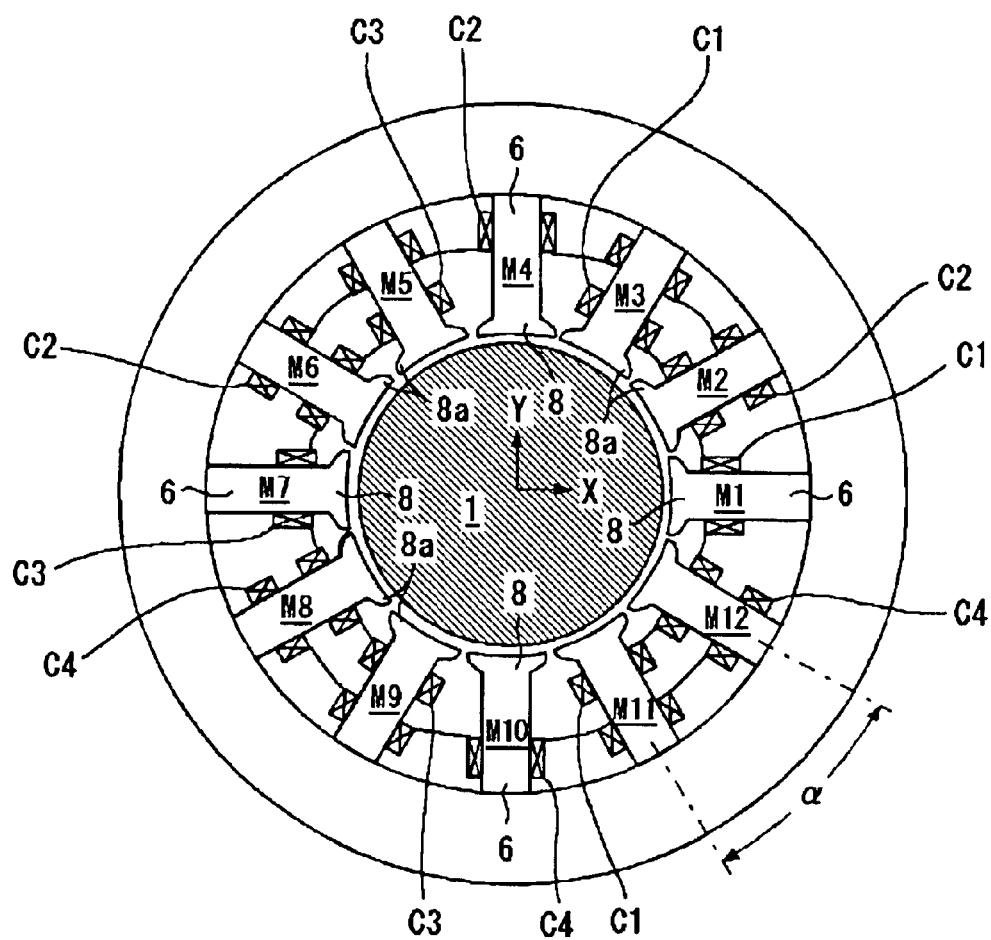
FIG. 8 is a cross-sectional view of a controlled type magnetic radial bearing which shows a fifth embodiment of the present invention.
Figure 9:
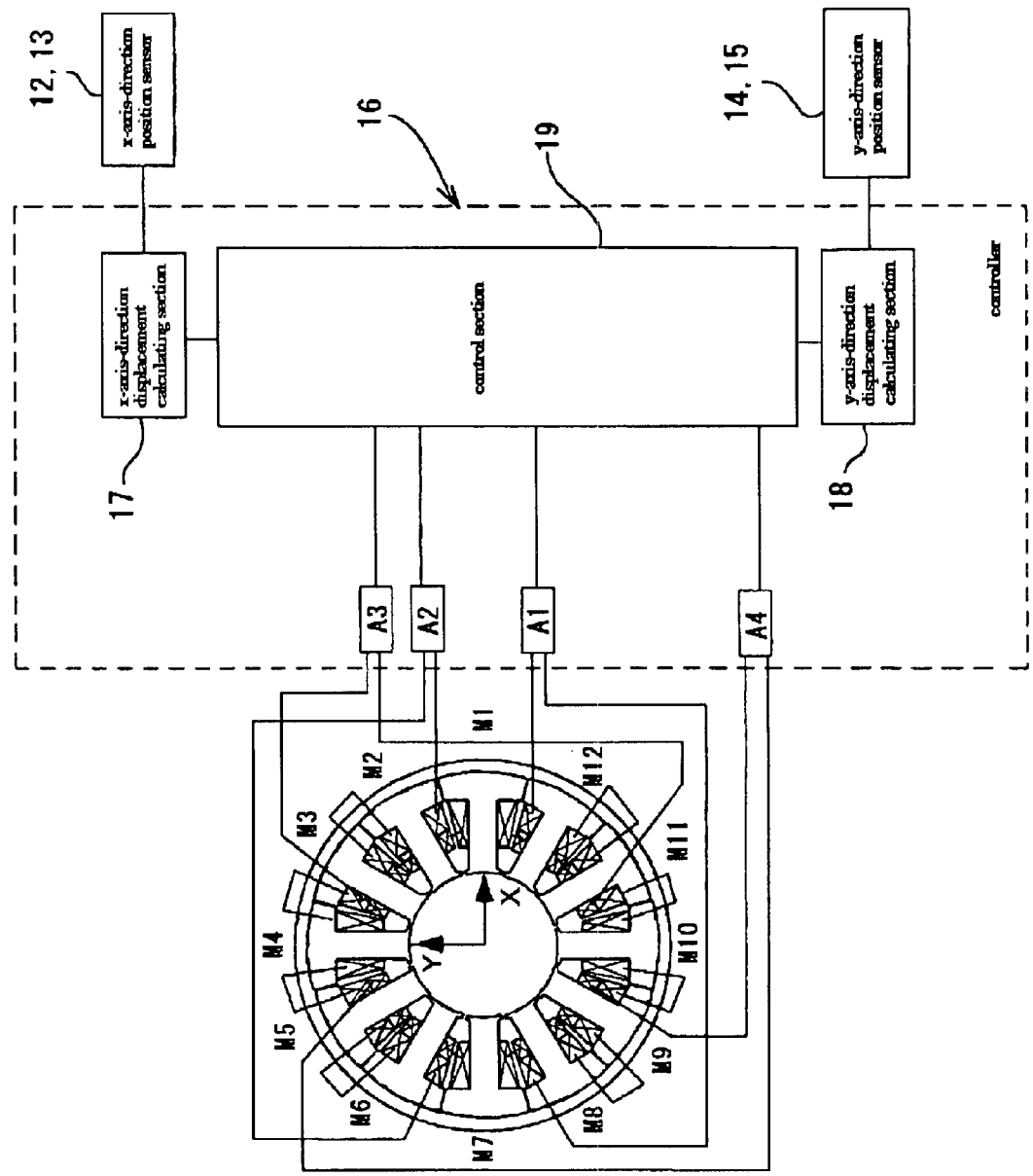
FIG. 9 is a block diagram showing a constitution of a control system of the fifth embodiment.

FIGS. 8 and 9 show a fifth embodiment according to the present invention. A magnetic radial bearing in the fifth embodiment is of a homo-polar type similar to that of the first embodiment described above. FIG. 8 shows a cross sectional view and FIG. 9 shows a constitution of a control system. In FIGS. 8 and 9 in the fifth embodiment, the same notational symbol is given to the portion corresponding to that of the first embodiment in FIGS. 1 and 3.

The magnetic radial bearing is equipped with twelve homo-polar type electromagnets M1 to M12 arranged similar to the case of the first embodiment. The constitution of the respective electromagnets M is similar to that in the first embodiment shown in FIG. 2 except for winding of a coil described below.

The magnetic radial bearing is provided with four groups of coils C1, C2, C3 and C4, which are respectively corresponding to the four main electromagnets M1, M4, M7 and M10. The coils are generically named as the notational symbol C. An exciting current combined with a bias current and the control current is individually supplied to the respective groups of the coils C from a controller 16. The coil C of each group is wound around its main electromagnet M and the sub-electromagnets M that are positioned on the same side in the control axis direction as the main electromagnet M with respect to the center of the rotary body 1. The number of turns of the coil C of each electromagnet M is determined so as to change in a cosine wave shape when that of the main electromagnet M is regarded as "1".

Concretely, a coil (first coil) C1 of a first group is wound around a first to a third, an eleventh and a twelfth electromagnets M1, M2, M3, M11 and M12. A coil (second coil) of a second group is wound around a second to sixth electromagnet M2 to M6, a coil (third coil) C3 of a third group is wound around a fifth to a ninth electromagnets M5 to M9 and a coil (fourth coil) C4 of a fourth group is wound around an eighth to a twelfth electromagnets M8 to M12.

When the numbers of turns of the first coil C1 and the third coil C3 in the first electromagnet M1 and the seventh electromagnet M7 are set to be Nx0 and the numbers of turns of the second coil C2 and the fourth coil C4 in the fourth electromagnet M4 and the tenth electromagnet M10 are set to be Ny0, the number of turns Nx of the first coil C1 or the third coil C3 wound around an electromagnet at an arbitrary position θ and the number of turns Ny of the second coil C2 or the fourth coil C4 are generally expressed as the following expressions.

$$Nx = Nx0 \cdot |\cos \theta| \quad (17)$$

$$Ny = Ny0 \cdot |\sin \theta| \quad (18)$$

Accordingly, when the numbers of turns of the first coil C1 or the third coil C3 in the respective electromagnets M are set to be Nx1 to Nx12 and the numbers of turns of the second coil C2 or the fourth coil C4 are set to be Ny1 to Ny12, these are expressed as follows.

$$Nx1 = Nx7 = Nx0 \cdot \cos 0 = Nx0 \quad (19)$$

$$Nx2 = Nx6 = Nx8 = Nx12 = Nx0 \cdot \cos \theta = 0.866 \cdot Nx0 \quad (20)$$

$$Nx3 = Nx5 = Nx9 = Nx11 = Nx0 \cdot \cos 2\theta = 0.5 \cdot Nx0 \quad (21)$$

$$Nx4 = Nx10 = Nx0 \cdot \cos 3\theta = 0 \quad (22)$$

$$Ny1 = Ny7 = Nx0 \cdot \sin 0 = 0 \quad (23)$$

$$Ny2 = Ny6 = Ny8 = Ny12 = Ny0 \cdot \sin \alpha = 0.5 \cdot Ny0 \quad (24)$$

$$Ny3 = Ny5 = Ny9 = Ny11 = Ny0 \cdot \sin 2\alpha = 0.866 \cdot Ny0 \quad (25)$$

$$Ny4 = Ny10 = Ny0 \cdot \sin 3\alpha = Ny0 \quad (26)$$

Normally, Nx0 and Ny0 are equal.

The constitution of the controller 16 is similar to the first embodiment except for the number of amplifiers A and a part of processing in a control section 19. The controller 16 is provided with four amplifiers A1, A2, A3 and A4 respectively corresponding to four groups of the coils C.

In the controller 16, as the first embodiment, the control section 19 calculates a control current value Ixc in an X-axis direction and a control current value Iyc in a Y-axis direction and outputs a signal combined with a bias-current value signal proportional to a constant bias-current value Io and a control current value signal proportional to the control current values Ixc and Iyc to the corresponding amplifier A as an exciting-current value signal. Four amplifiers A amplify four exciting-current value signals and supply exciting currents to four corresponding coils C. When the exciting-current value supplied to the first coil C1 from the first amplifier A1 is I1, the exciting-current value supplied to the second coil C2 from the second amplifier A2 is I2, the exciting-current value supplied to the third coil C3 from the third amplifier A3 is I3 and the exciting-current value supplied to the fourth coil C4 from the fourth amplifier A4 is I4, these are expressed as follows.

$$I1 = I0 + Ixc \quad (27)$$

$$I2 = I0 + Iyc \quad (28)$$

$$I3 = I0 - Ixc \quad (29)$$

$$I4 = I0 - Iyc \quad (30)$$

In this case, the same exciting current is supplied to the coils C of the respective groups. As mentioned above, since the numbers of turns of the coils C of each group are changed based on the position of the electromagnets M, the flux densities by the exciting current in the coils C of each group are changed in a cosine wave shape when the main electromagnet M of the group is regarded as "1". As a whole, the flux densities by the respective electromagnets M become the positive maximum value on the side where the rotary body 1 is attracted and become the negative minimum value on the opposite side and, moreover, the change of the flux density in the circumferential direction becomes in a cosine wave shape.

Figure 10:
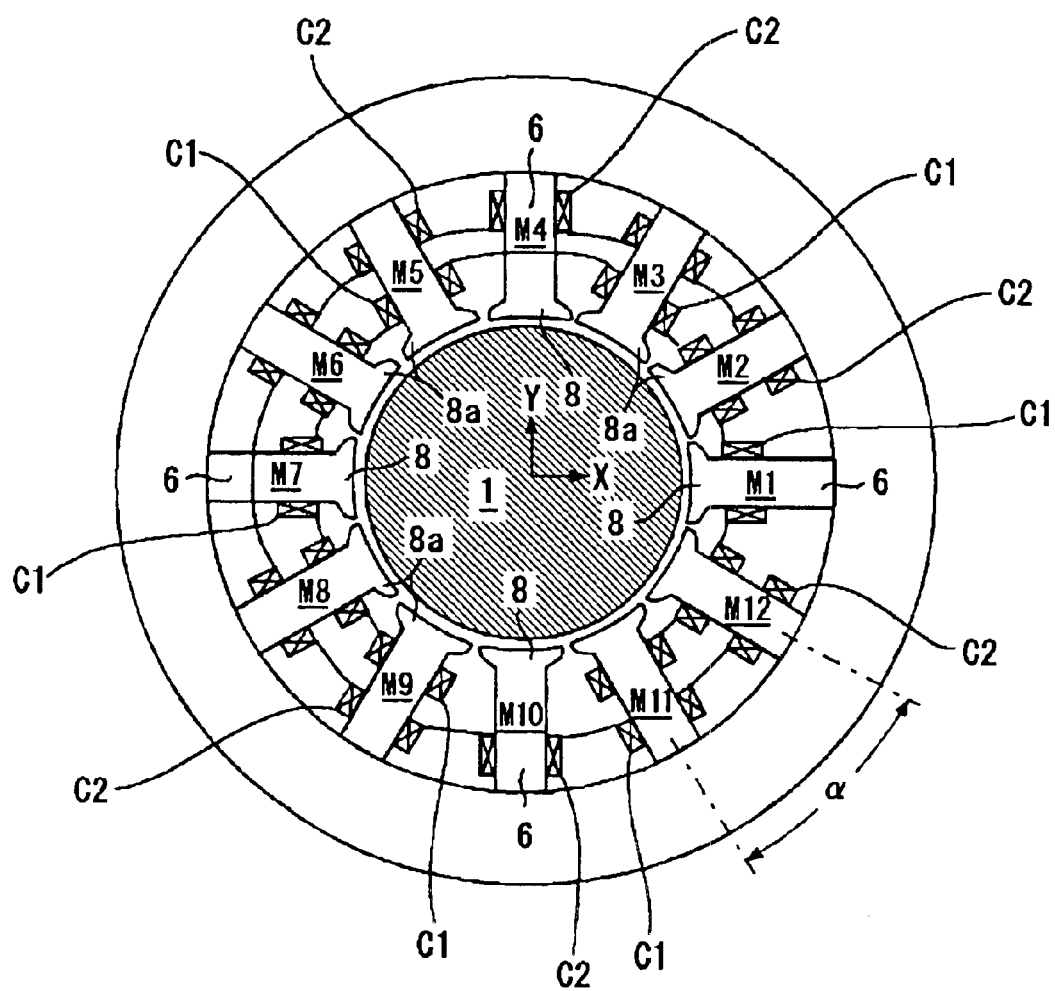
FIG. 10 is a cross-sectional view of a controlled type magnetic radial bearing which shows a sixth embodiment of the present invention.
Figure 11:
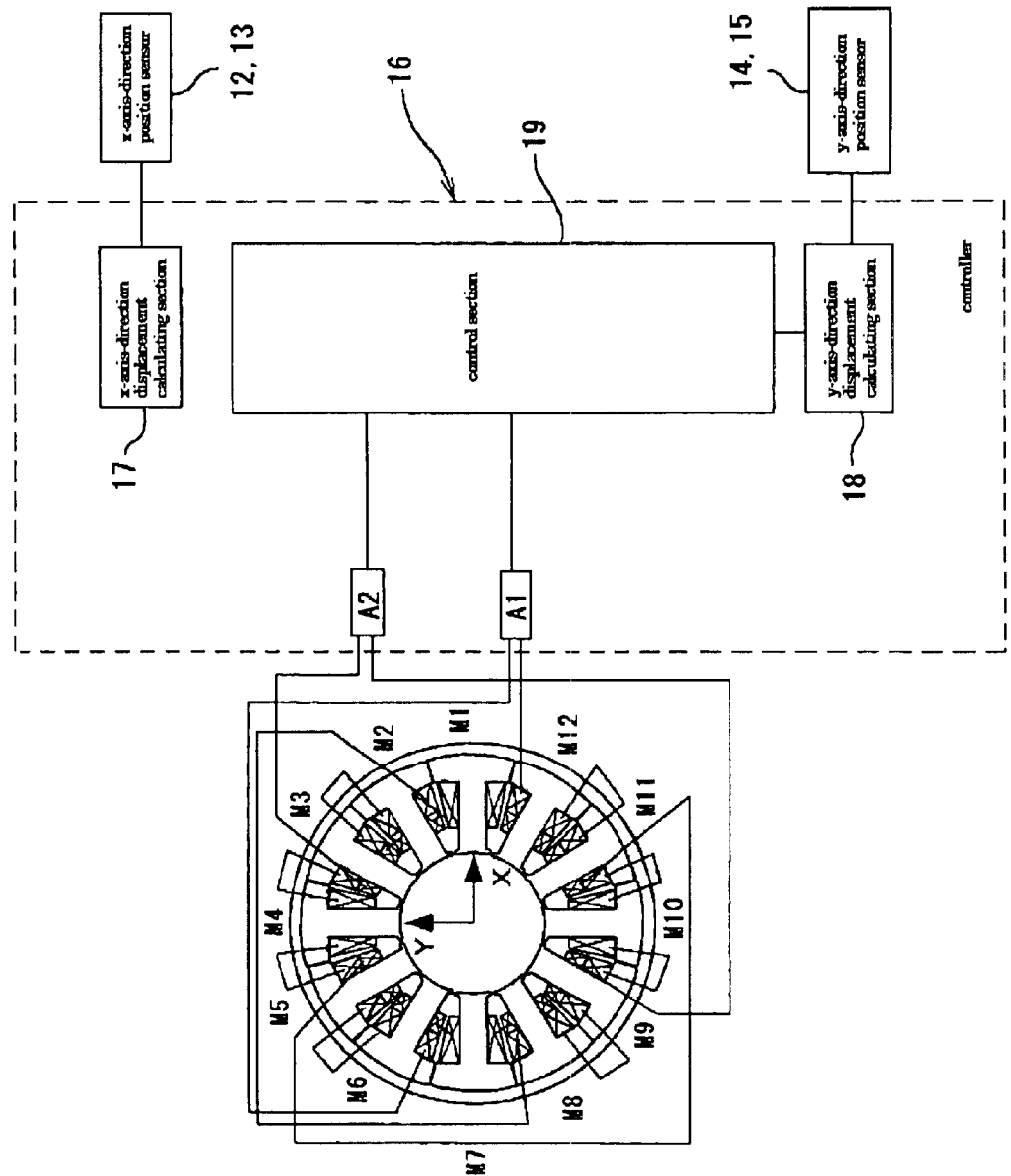
FIG. 11 is a block diagram showing a constitution of a control system of the sixth embodiment.

FIGS. 10 and 11 show a sixth embodiment according to the present invention. A magnetic radial bearing of the sixth embodiment is a hybrid type similar to the second embodiment and has a constitution similar to the fifth embodiment. FIG. 10 shows a cross sectional view and FIG. 11 shows a constitution of a control system. In FIGS. 10 and 11 in the sixth embodiment, the same notational symbol is given to the portion corresponding to the fifth embodiment described above in FIGS. 8 and 9.

A magnetic radial bearing is equipped with twelve hybrid type electromagnets M1 to M12 arranged in a similar manner as the second embodiment. The constitution of each electromagnet M is similar to the second embodiment shown in FIG. 4 except for winding of the coil as described below.

The magnetic radial bearing in the present embodiment is provided with two groups of coils C1 and C2 corresponding to an X-axis and a Y-axis respectively. Control currents are individually supplied to the coils C of respective groups from the controller 16. The coil C of each group is wound around two main electromagnets M of the control axis of the group and all the sub-electromagnets M. The numbers of turns of the coil C of each electromagnet M are determined so as to be changed in a cosine wave shape when the main electromagnet M is regarded as "1".

Concretely, the coil (first coil) C of the first group is wound around a first to a third electromagnets M1 to M3, a fifth to a ninth electromagnets M5 to M9 and an eleventh and a twelfth electromagnets M11 and M12. The coil (second coil) C2 of the second group is wound around a second to a sixth electromagnets M2 to M6 and a seventh to a twelfth electromagnets M7 to M12.

When the number of turns of the first coil C1 in the first electromagnet M1 and the seventh electromagnet M7 is set to be Nx0 and the number of turns of the second coil C2 in the fourth electromagnet M4 and the tenth electromagnet M10 is set to be Ny0, the number of turns Nx of the first coil C1 and the number of turns Ny of the second coil C2 wound around the electromagnet at an arbitrary position θ are generally expressed by the aforementioned expressions (17) and (18).

Therefore, when the numbers of turns of the first coil C1 in the respective electromagnets M are set to be Nx1 to Nx12 and the numbers of turns of the second coil C2 are set to be Ny1 to Ny12, these are expressed by the aforementioned expressions (19) to (26).

The first coil C1 is wound around five pairs of electromagnets M which are opposed to each other in the radial direction. The winding directions of the coil C1 of the opposing two electromagnets M are reversed to each other so that one of the opposing electromagnets M is in the positive direction and the other is in the negative direction when a control current is supplied in a manner described later.

A constitution of the controller 16 is similar to the fifth embodiment except for the number of amplifiers A and a part of processing in the control section 19. The controller 16 is provided with two amplifiers A1 and A2 corresponding respectively to two groups of coils C.

In the controller 16, as similar to the second embodiment, a control section 19 calculates a control current value Ixc in an X-axis direction and a control current value Iyc in a Y-axis direction and outputs control current value signals proportional to these control current values Ixc and Iyc to the corresponding amplifiers A. The control current Ixc is supplied to the first coil C1 from the first amplifier A1 and the control current Iyc is supplied to the second coil C2 from the second amplifier A2. Thereby the control current Ixc is supplied to the first coil 1 of the first to the third electromagnets M1 to M3, the eleventh and the twelfth electromagnets M11 and M12. On the other hand, the control current (−Ixc) in the opposite direction is supplied to the fifth to the ninth electromagnets M5 to M9 since the winding direction of the first coil C1 is reversed as described above. Similarly, the control current Iyc is supplied to the second coil C2 of the second to the sixth electromagnets M2 to M6. On the other hand, the control current (−Iyc) in the opposite direction is supplied to the eighth to the twelfth electromagnets M8 to M12 since the winding direction of the second coil C2 is reversed as described above.

In this case, the same exciting current is respectively supplied to the coils C of the respective groups. However, as described above, since the numbers of turns of the coils C of each group are changed dependent on the positions of the electromagnets M, the flux densities by the control current in the coils C of each group are changed to a cosine wave shape when the two main electromagnets M of the group are regarded as "1". That is, the total flux density combined with the bias magnetic flux and the control magnetic flux becomes the positive maximum value on the side where the rotary body 1 is attracted and the negative minimum value on the opposite side and, moreover, the change of the flux density in the circumferential direction is formed in a cosine wave shape.

In the magnetic radial bearings of the above-mentioned first to the sixth embodiments, protruded parts 8a are formed in the portion of the respective salient poles 8 and 9 of each electromagnet M, which are opposed to the rotor parts 2 and 3 of the rotary body 1. Accordingly, the flux density is gradually changed also in the portion of the salient poles 8 and 9 in the circumferential direction. Since the adjacent protruded parts 8a of the salient poles 8 and 9 are closely positioned to each other, the difference of the flux densities between a portion with the salient poles 8 and 9 and a portion having no salient poles 8 and 9 becomes small and the change of the flux density between the salient poles 8 and 9 becomes small. Consequently, the change of the flux density in the circumferential direction becomes smaller as a whole. However, such protruded parts 8a of the salient poles 8 and 9 are not necessarily required in magnetic radial bearings of the constitution such as the first to the sixth embodiments.

Figure 12:
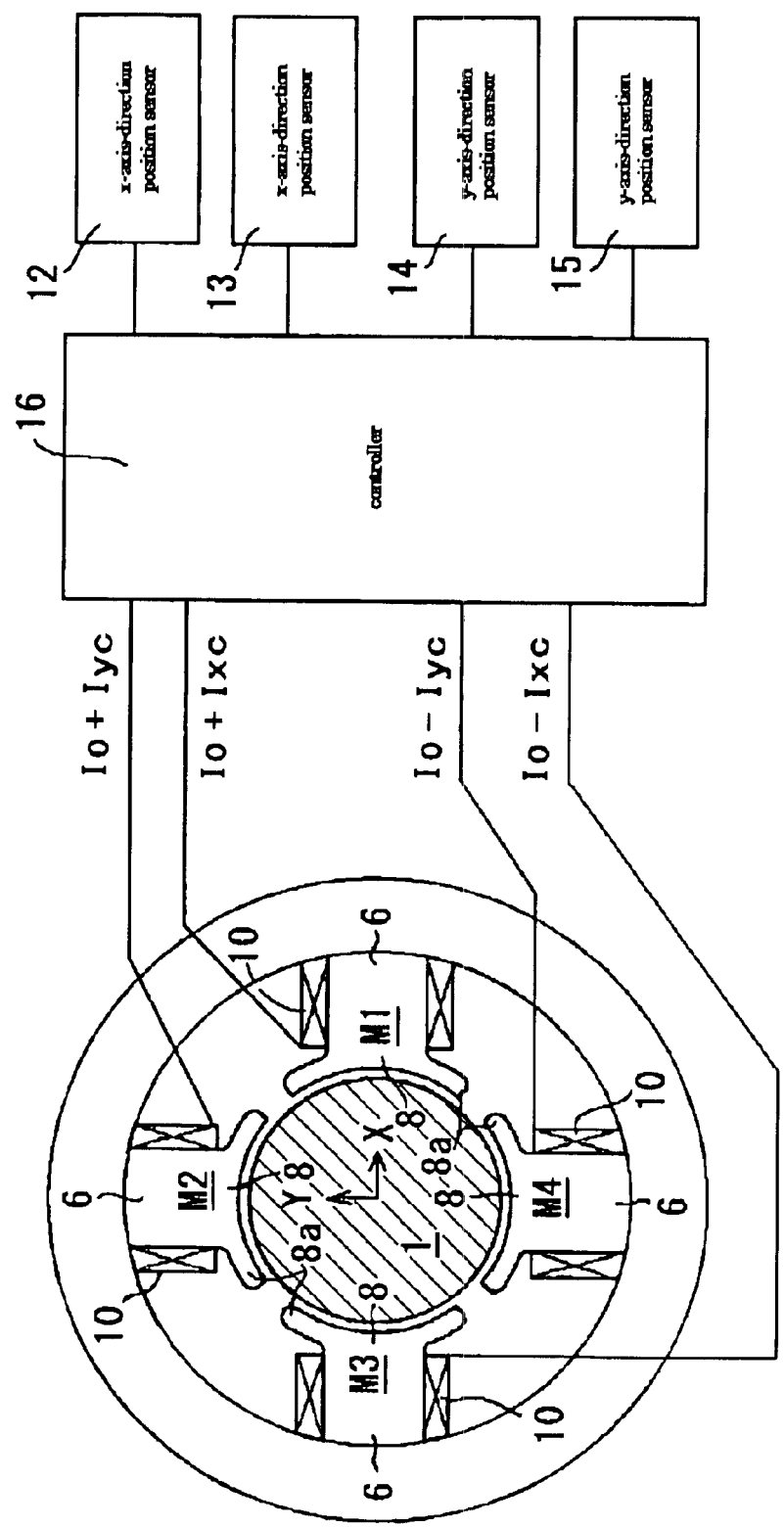
FIG. 12 is a block diagram showing a cross-section of a controlled type magnetic radial bearing and a constitution of control system, which is a seventh embodiment of the present invention.

FIG. 12 shows a seventh embodiment according to the present invention. A magnetic radial bearing of the seventh embodiment is of a homo-polar type and FIG. 12 shows a cross sectional view and a constitution of a control system. In FIG. 12 according to the seventh embodiment, the same notational symbol is given to the portion corresponding to the first embodiment in FIGS. 1 and 3.

The magnetic radial bearing is equipped with four homo-polar type electromagnets M1, M2, M3, and M4 disposed with equal intervals in the circumferential direction in a similar manner as a conventional homo-polar type magnetic radial bearing. These four electromagnets M1, M2, M3 and M4 are respectively correspond to the four main electromagnets M1, M4, M7 and M10 in the first embodiment.

The constitution of each electromagnet M is similar to that of the first embodiment shown in FIG. 2. An inner face (end surface) in the radial direction of the respective salient poles 8 and 9 opposing to the rotor parts 2 and 3 is formed in a concave circular shape along the outer peripheral face of the rotor parts 2 and 3. Protruded parts 8a and 8a projected in the circumferential direction are integrally formed at both ends of the end surface in the circumferential direction and the adjacent protruded parts 8a in the circumferential direction is closely positioned to each other. Moreover, coils 10 to which an exciting current is individually supplied are respectively wound around the salient poles 8 of the electromagnets M.

The constitution of a controller 16 is similar to that of the fifth embodiment shown in FIG. 9. Exciting currents I1, I2, I3 and I4 expressed by the aforementioned expressions 27 to 30 are supplied to the coils 10 of the respective electromagnets M from the controller 16. Other constitution is similar to that of the first or the fifth embodiment.

Figure 13:
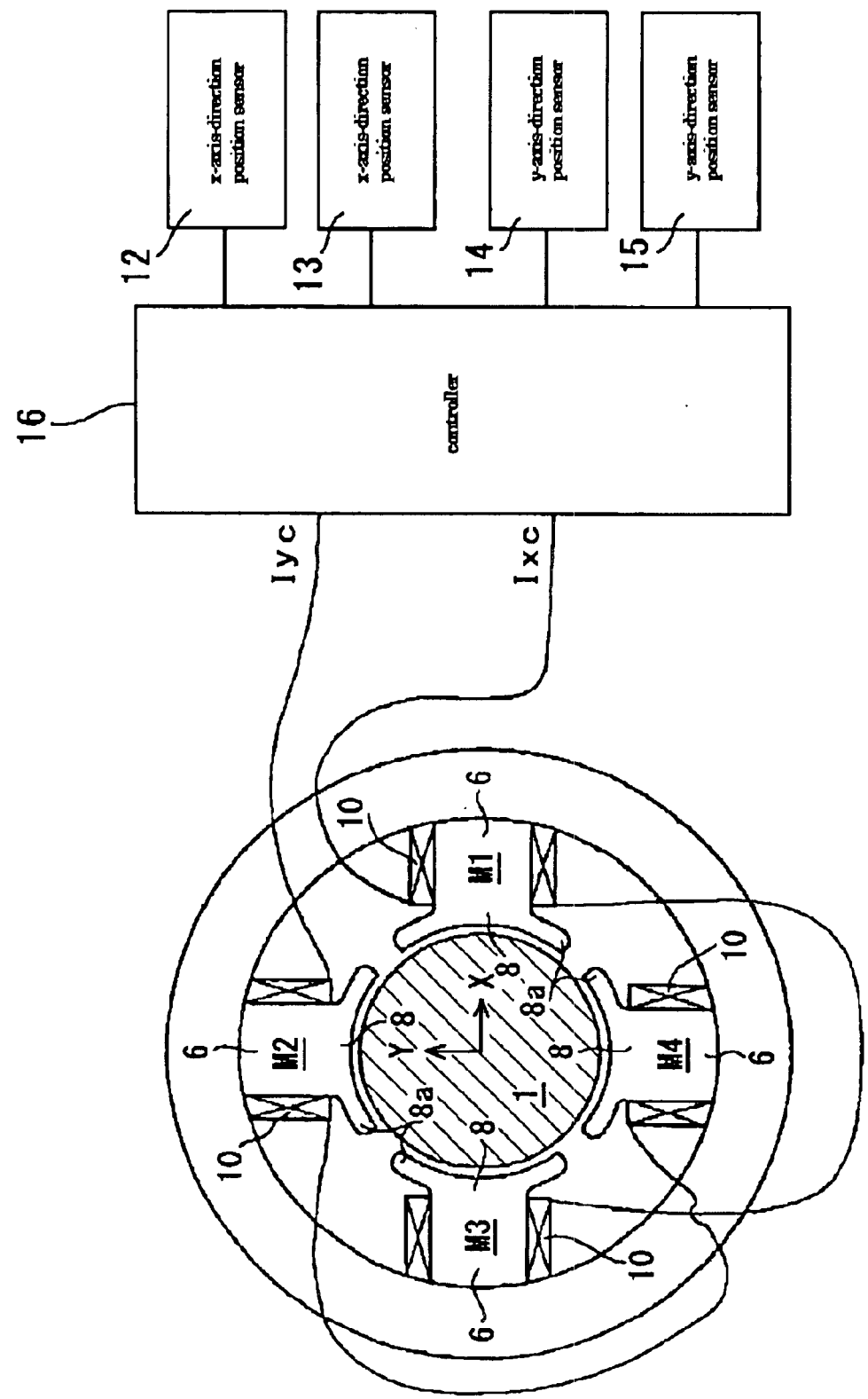
FIG. 13 is a block diagram showing a cross-section of a controlled type magnetic radial bearing and a constitution of a control system, which is an eighth embodiment of the present invention.

FIG. 13 shows an eighth embodiment according to the present invention. A magnetic radial bearing of the eighth embodiment is of a hybrid type and similar to the constitution of the seventh embodiment. FIG. 13 shows a cross sectional view and a constitution of a control system. In FIG. 13 according to the eighth embodiment, the same notational symbol is given to the portion corresponding to the first embodiment in FIGS. 3 and 5 and the seventh embodiment in FIG. 12.

The magnetic radial bearing is equipped with four hybrid type electromagnets M1 to M4 arranged in a similar manner as the seventh embodiment. The constitution of each electromagnet M is similar to that of the second embodiment shown in FIG. 4. Coils 10 of two electromagnets M1 and M3 in an X-axis direction are connected in series and the same control current is supplied to the coils 10. Also, the winding directions of the coils 10 of the respective electromagnets M1 and M3 are reversed to each other in such a manner that one of the coils is in the positive direction and the other is in the opposite direction when the same control current is supplied to the coils 10 of the two electromagnets M1 and M3, The constitution of two electromagnets M2 and M4 in a Y-axis direction is similar to that of the two electromagnets M1 and M3

The constitution of a controller 16 is similar to that of the sixth embodiment shown in FIG. 11. The control current Ixc is supplied to the coils 10 of the two electromagnets M1 and M3 in the X-axis direction from the controller 16 and the control current Iyc is supplied to the two electromagnets M2 and M4 in the Y-axis direction.

Other constitutions are similar to those of the second, sixth and seventh embodiments, but the electromagnets such as those as shown in FIG. 6 or 7 can also be applied to the electromagnet in the eighth embodiment.

In the magnetic radial bearing according to the seventh and eighth embodiments described above, the protruded parts 8a are formed in the portion of the salient poles 8 and 9 of each electromagnet M opposing to the rotor parts 2 and 3 of the rotary body 1. Accordingly, the flux density is gradually changed in the portion of the salient poles 8 and 9 along the circumferential direction. Also, since the adjacent protruded parts 8a of the salient poles 8 and 9 are closely positioned to each other, the difference of the flux densities between the portion with salient poles 8 and 9 and the portion with no salient poles 8 and 9 becomes small, and thus the change of the flux density between salient poles 8 and 9 becomes small. Consequently, the change of the flux density along the circumferential direction becomes smaller as a whole.

Figure 14:
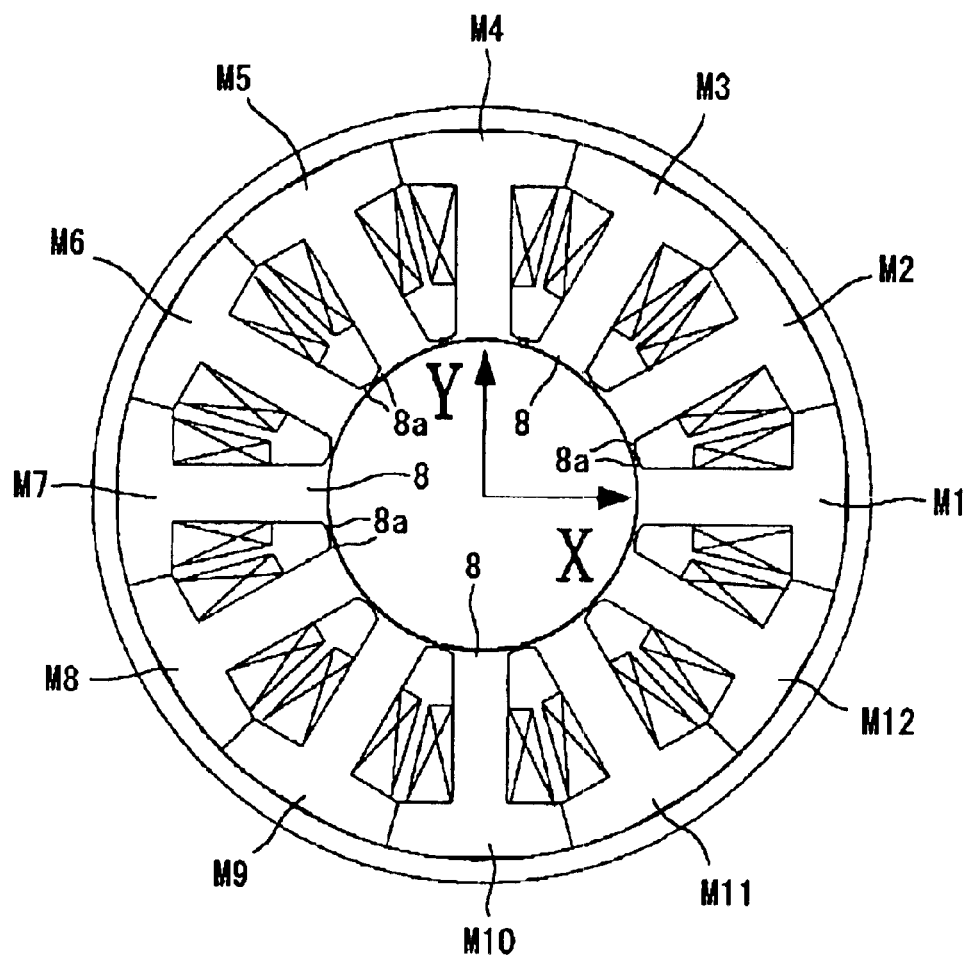
FIG. 14 is a cross-sectional view of a controlled type magnetic radial bearing in an embodiment in which closed slot type electromagnet poles are adopted.
Figure 15:
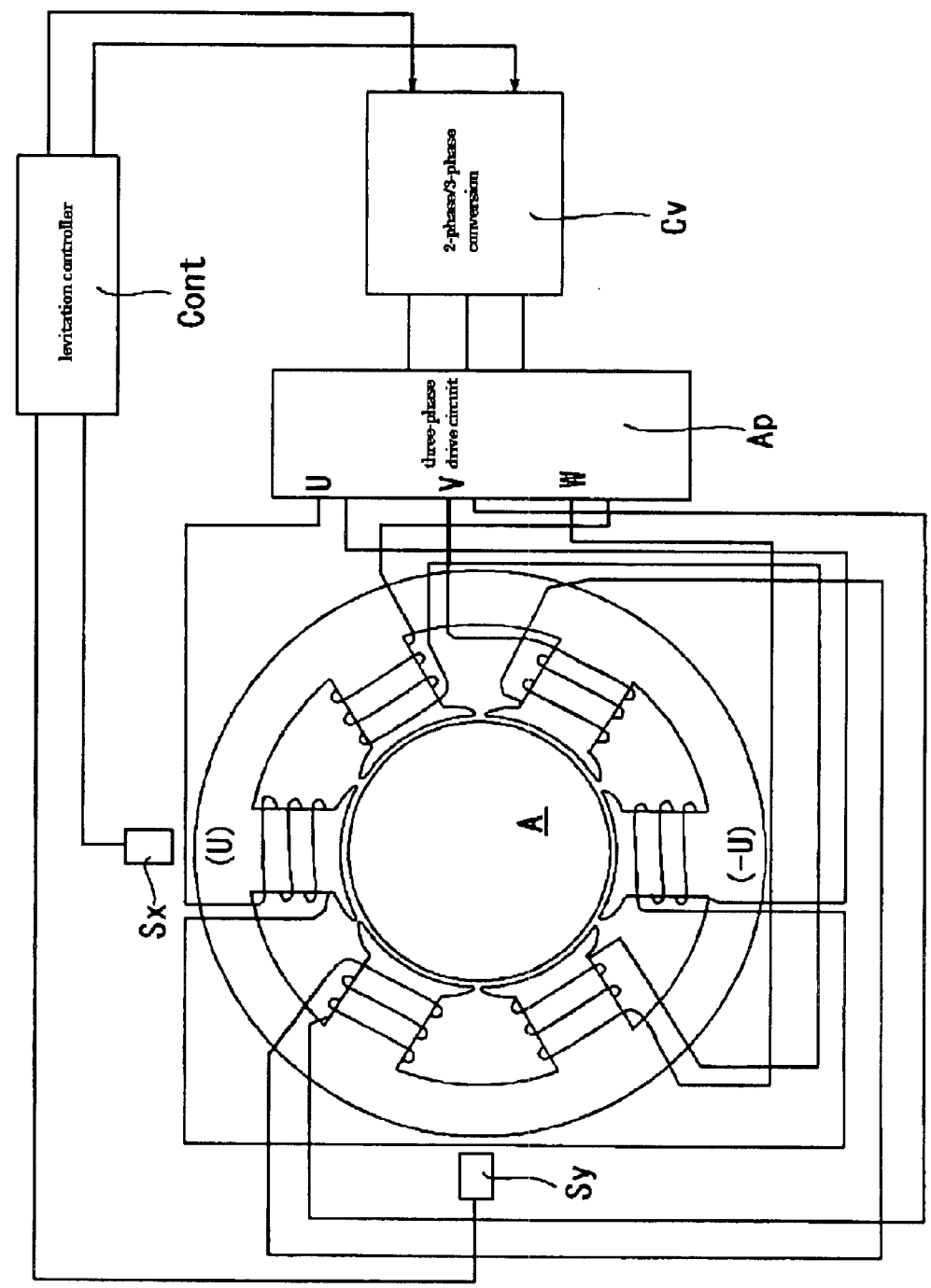
FIG. 15 is a block diagram showing an example of constitution of a magnetic radial bearing when control currents in six salient poles are controlled by using a three-phase inverter.

In an embodiment shown in FIG. 14, so-called closed slot type electromagnet poles are used for a magnetic radial bearing. The magnetic radial bearing is provided with twelve homo-polar type electromagnets M1, M2, M3, M4, M5, M6, M7, M8, M9, M10, M11 and M12, similar to the first embodiment described above. A salient pole 8 is formed so as to project inside in the radial direction in each of the electromagnets M and protruded parts 8a and 8a protruded in the circumferential direction are integrally formed at both ends of the inner face (end surface) in the radial direction of the salient pole 8 of the electromagnets M along the circumferential direction. The circumferential end portions of the adjacent protruded parts 8a are connected with each other.

When such closed slot type electromagnet poles are used, the flux density is changed continuously and extremely smoothly in the portion of the salient pole 8 along the circumferential direction of the rotary body. Accordingly, the difference of the flux densities between the portion with salient pole and the portion with no salient pole almost disappears by the connection of the adjacent salient poles 8 and 8 and the flux densities between the salient poles 8 are changed in an extremely smooth state. Therefore the eddy current loss and rotation loss are reduced.

INDUSTRIAL APPLICABILITY

The controlled type magnetic radial bearing according to the present invention is useful for an energy-storage flywheel, an ultra high-speed rotating body or the like which is supported in a non-contact manner in a radial direction.

What is claimed is:

1. A controlled type magnetic radial bearing provided with plural electromagnet poles having a core wound around with a coil and arranged at predetermined intervals along a circumferential direction of a rotary body at the same position in an axial direction of the rotary body, all of the electromagnet poles being set in the same polarity, characterized in that the flux densities in the electromagnet poles are gradually changed in the circumferential direction of the rotary body.

2. The controlled type magnetic radial bearing according to claim 1, wherein the number of the electromagnet poles is at least three.

3. The controlled type magnetic radial bearing according to claim 2, wherein the flux densities of the respective electromagnet poles are gradually changed along the circumferential direction of the rotary body by adjusting a control current supplied to the coil wound around each of the electromagnet poles.

4. The controlled type magnetic radial bearing according to claim 2, wherein each of the electromagnet poles is provided with plural groups of coils to which a control current is individually supplied and the flux densities of the respective electromagnet poles are gradually changed along the circumferential direction of the rotary body by means of winding the coils of each group around plural predetermined electromagnet poles in series and adjusting the number of turns of each coil of the same group with respect to each of the electromagnet poles.

5. The controlled type magnetic radial bearing according to claim 4, wherein the electromagnet poles are arranged in such a manner that sub-electromagnets are positioned on both sides of a main electromagnet and the number of turns of coil of each electromagnet is determined so as to change in a cosine wave shape when that of the main electromagnet is regarded as "1".

6. The controlled type magnetic radial bearing according to claim 5, wherein the number of turns of coil of the sub-electromagnet is set to be $N0 \cdot |\cos \theta|$, where $\theta$ is a position of the sub-electromagnet with respect to the main electromagnet at the starting point and $N0$ is the number of turns of coil of the main electromagnet.

7. The controlled type magnetic radial bearing according to claim 6, wherein, when the numbers of turns of coil in the x-axis and the y-axis directions of the main electromagnet are set to be $Nx0$ and $Ny0$, the number of turns $Nx$ and the number of turns $Ny$ wound around the sub-electromagnet at an arbitrary position $\theta$ are expressed as the following expressions $$Nx = Nx0 \cdot |\cos \theta|$$

$$Ny = Ny0 \cdot |\sin \theta|.$$

8. The controlled type magnetic radial bearing according to claim 5, wherein the electromagnet poles are arranged in such a manner that combinations of the main electromagnet and the sub-electromagnets positioned on both sides of the main electromagnet are disposed on both sides with respect to the rotary body and the coils of each group are connected in series with each other and wound around in opposite directions.

9. The controlled type magnetic radial bearing according to claim 2, wherein the electromagnet poles are provided with salient poles projected in the radial direction, both ends of the portion of each salient poles that are opposed to the rotary body are formed with protruded parts protruded in the circumferential direction of the rotary body, and the protruded parts of the adjacent salient poles are formed so as to be close each other.

10. The controlled type magnetic radial bearing according to claim 2, wherein the electromagnet poles are provided with salient poles projected in the radial direction, both ends of the portion of each salient poles that are opposed to the rotary body are formed with protruded parts protruded in the circumferential direction of the rotary body, and the magnetic flux is continuously changed in the circumferential direction of the rotary body by means of that the protruded parts of the adjacent salient poles are connected with each other.

11. The controlled type magnetic radial bearing according to claim 1, wherein the number of the electromagnet poles is a multiple of three or four.

12. The controlled type magnetic radial bearing according to claim 1, wherein the electromagnet is provided with a permanent magnet which has magnetic poles in the axial direction to form bias magnetic poles.

* * * * *